(12) United States Patent
Horiuchi

(10) Patent No.: US 8,526,121 B2
(45) Date of Patent: Sep. 3, 2013

(54) ZOOM LENS AND IMAGE PICKUP APPARATUS EQUIPPED WITH ZOOM LENS

(75) Inventor: Akihisa Horiuchi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 13/292,764

(22) Filed: Nov. 9, 2011

(65) Prior Publication Data

US 2012/0113527 A1    May 10, 2012

(30) Foreign Application Priority Data

Nov. 10, 2010   (JP) .................................. 2010-251844

(51) Int. Cl.
*G02B 15/14* (2006.01)
*G02B 27/64* (2006.01)
*H04N 5/225* (2006.01)

(52) U.S. Cl.
USPC ............................ 359/687; 348/340; 359/557

(58) Field of Classification Search
USPC .................. 348/340; 359/687, 684, 686, 557
See application file for complete search history.

(56) References Cited

U.S. PATENT DOCUMENTS

| 7,463,427 | B2 |   | 12/2008 | Nanjo et al. | |
|---|---|---|---|---|---|
| 8,228,616 | B2 | * | 7/2012 | Hagiwara | 359/687 |
| 8,248,707 | B2 | * | 8/2012 | Kimura et al. | 359/687 |
| 8,254,036 | B2 | * | 8/2012 | Aoi | 359/687 |
| 8,284,498 | B2 | * | 10/2012 | Shinohara et al. | 359/687 |
| 8,320,053 | B2 | * | 11/2012 | Misaka | 359/690 |

FOREIGN PATENT DOCUMENTS

JP   2002-244045 A   8/2002

* cited by examiner

*Primary Examiner* — David N Spector
(74) *Attorney, Agent, or Firm* — Canon U.S.A., Inc. IP Division

(57) ABSTRACT

A zoom lens includes first and second lens units having positive and negative refractive powers, an aperture stop, and third and fourth lens units having positive and negative refractive powers in order from an object side to an image side. During zooming from a wide angle end to a telephoto end, the first lens unit remains fixed, and the second and fourth lens units move. The first lens unit includes negative, positive, negative, positive, and positive lenses in order from the object side to the image side, the third and fourth lens units include two or more lenses. Focal lengths of the first and third lens units and of the entire system at the wide angle end, the thickness of the first lens unit on an optical axis, and the distance between principal points between the first and the second lens units at a wide angle end are appropriately set.

12 Claims, 23 Drawing Sheets

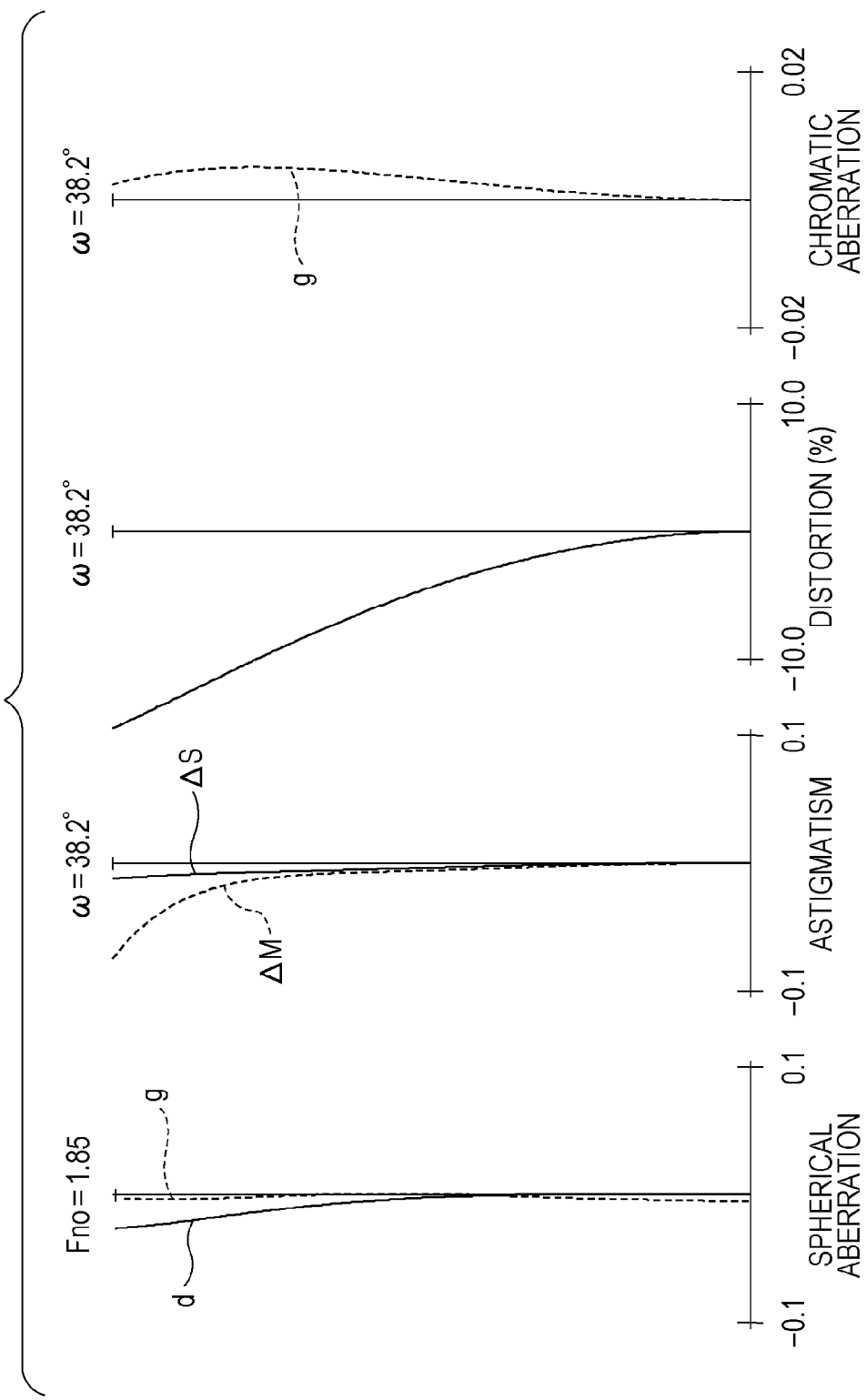

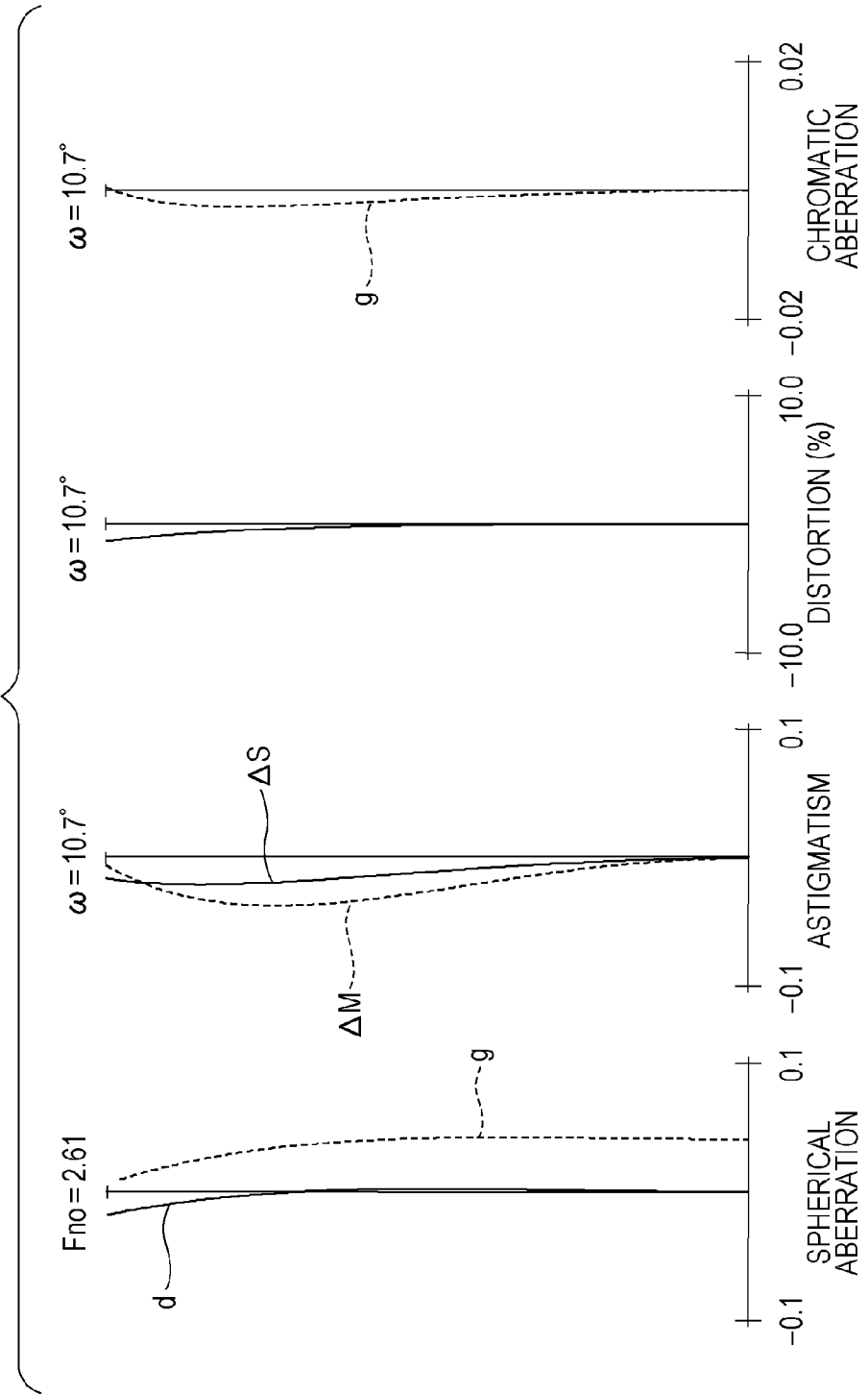

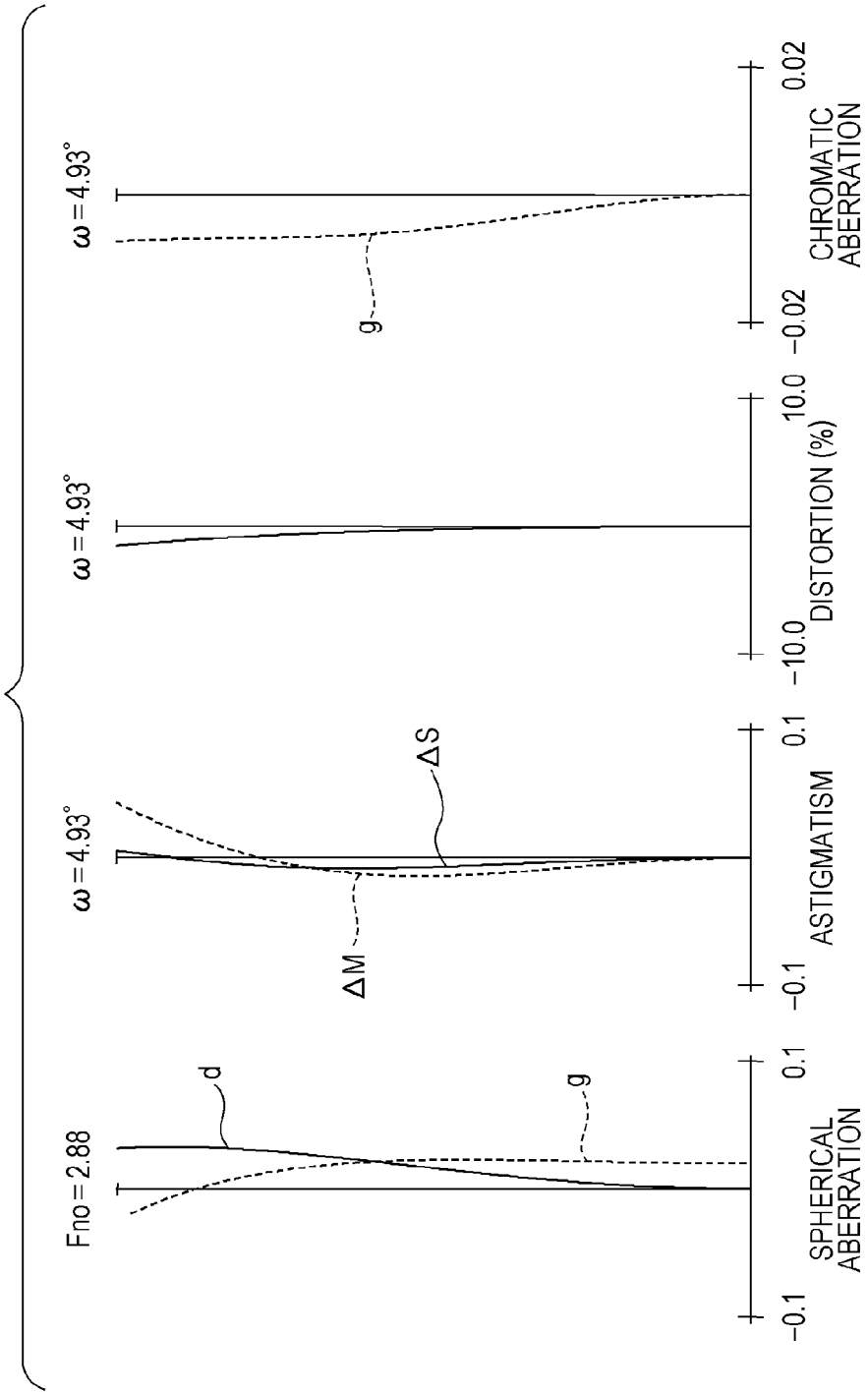

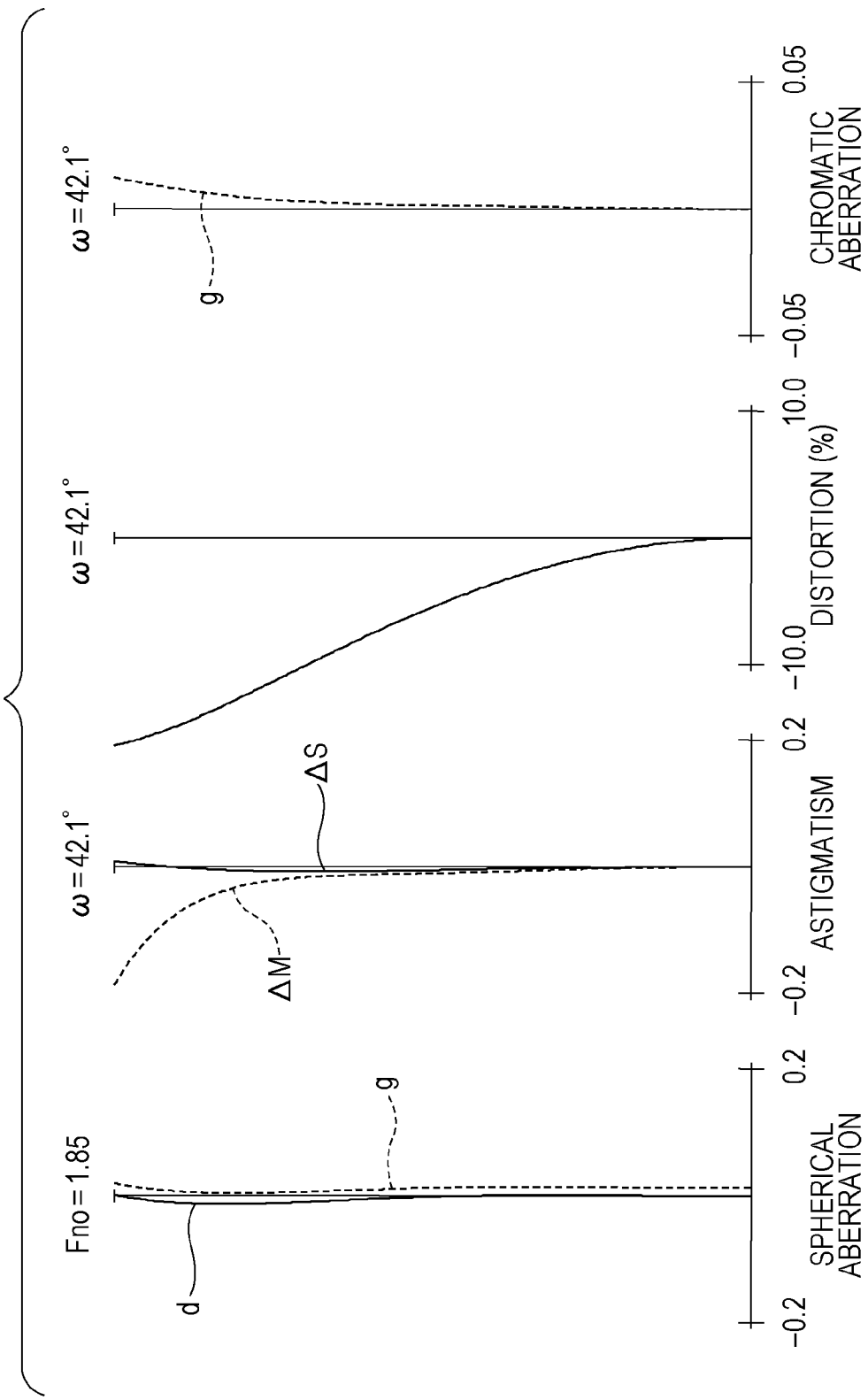

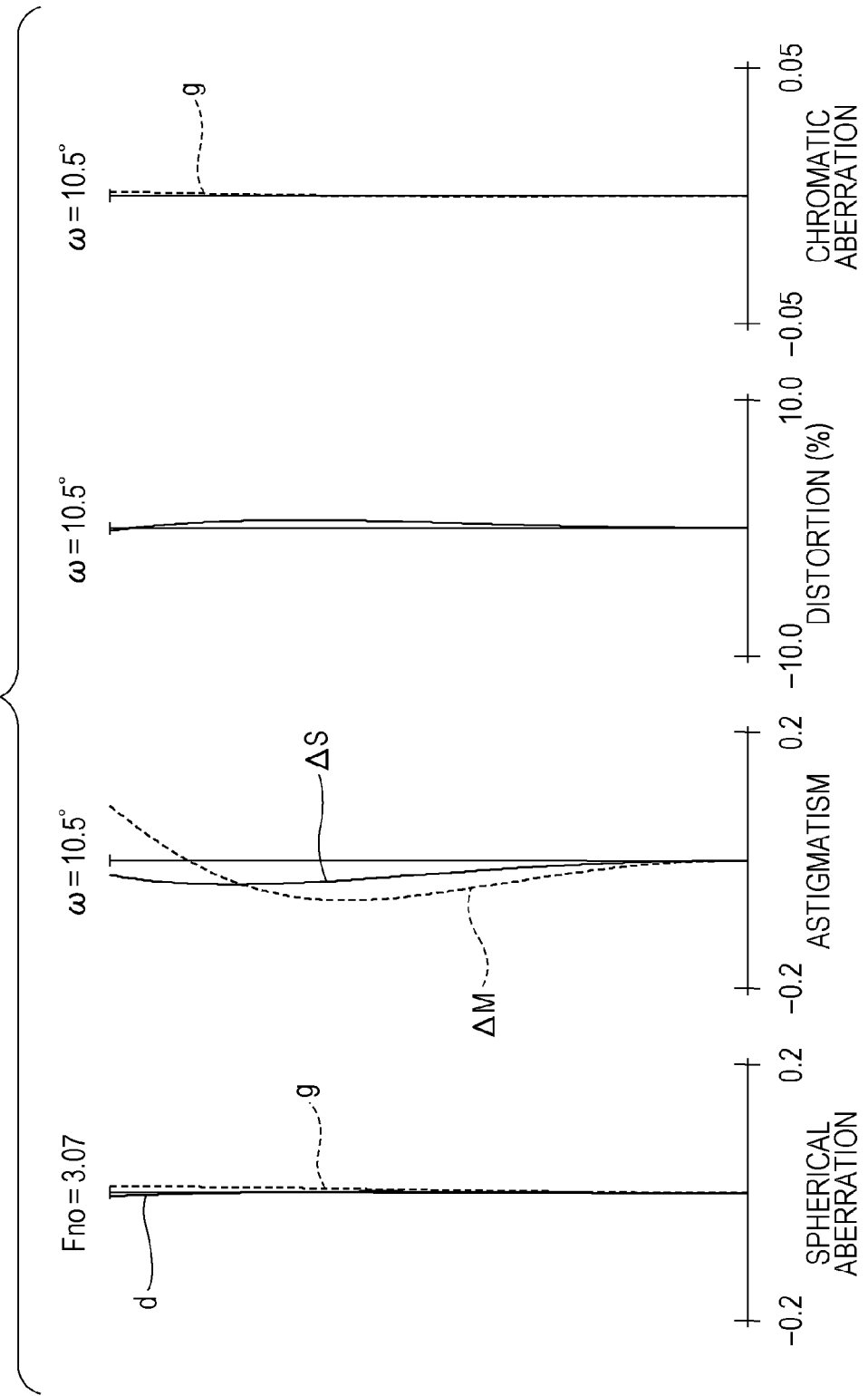

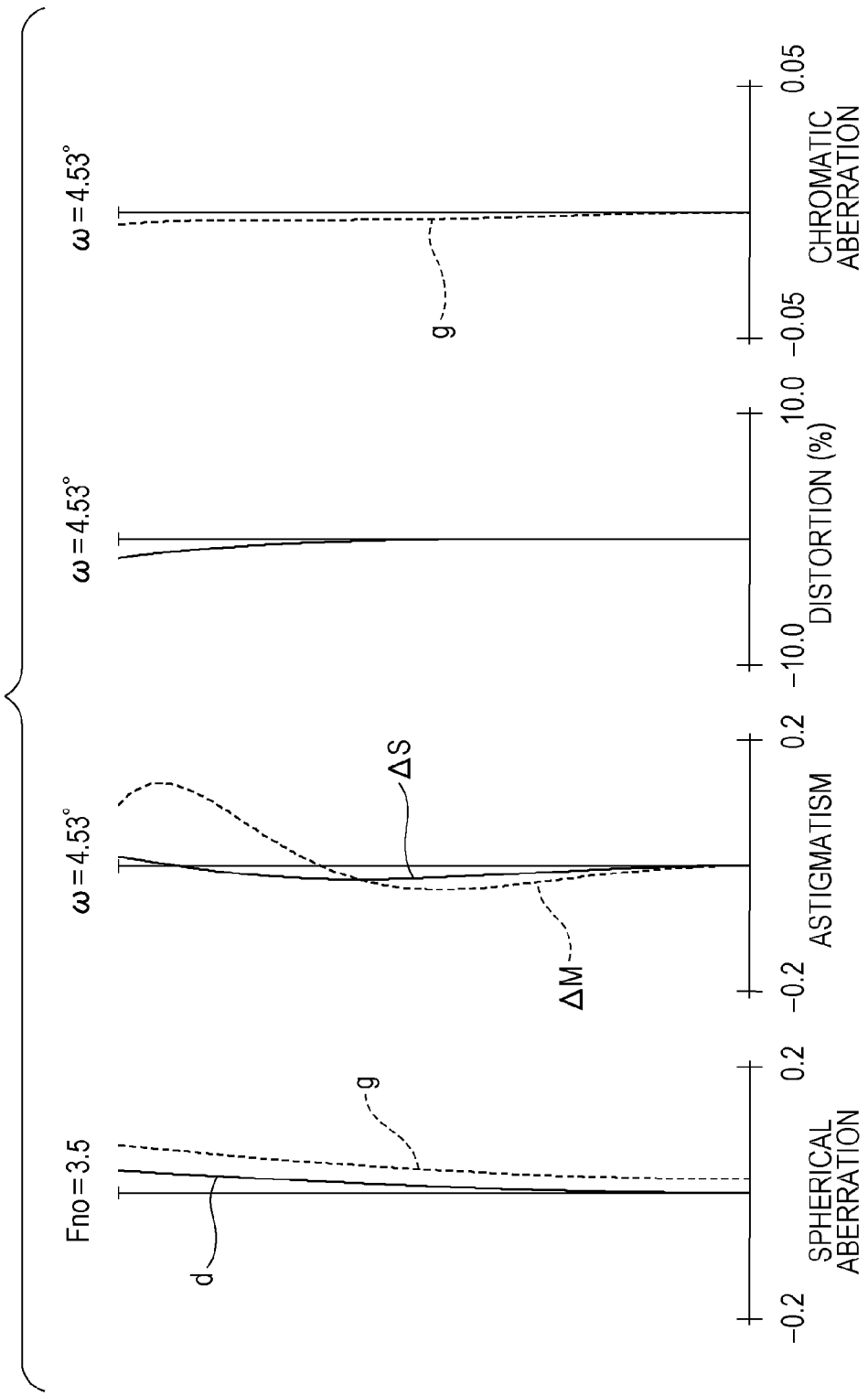

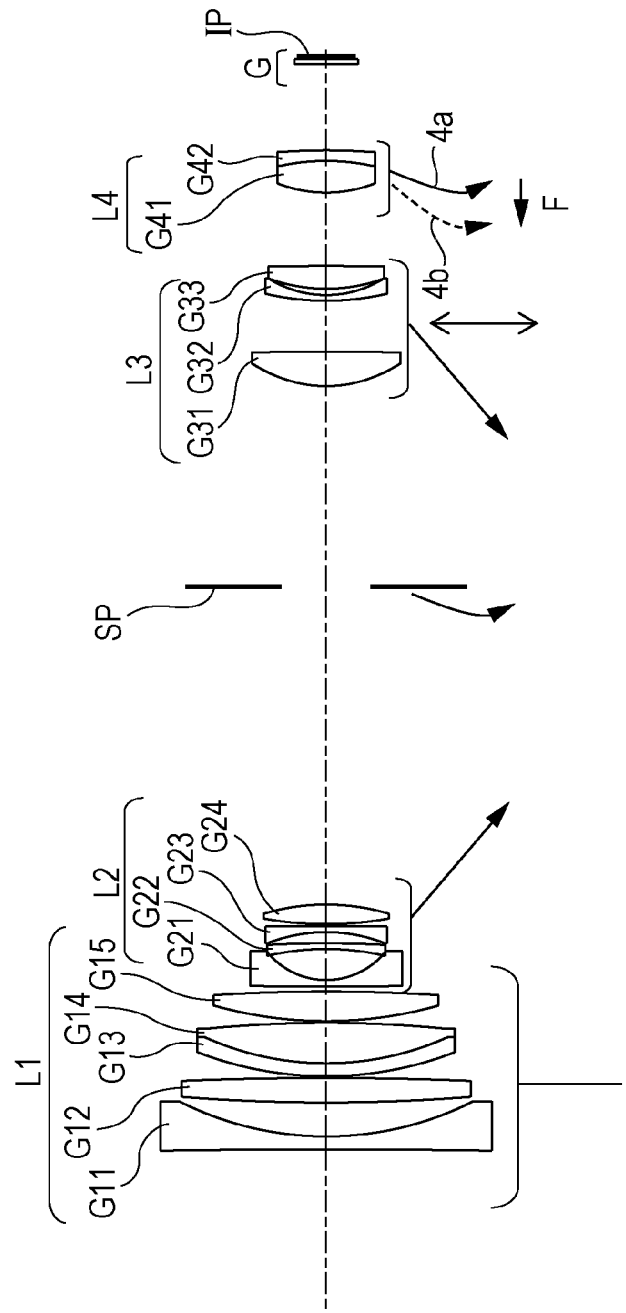

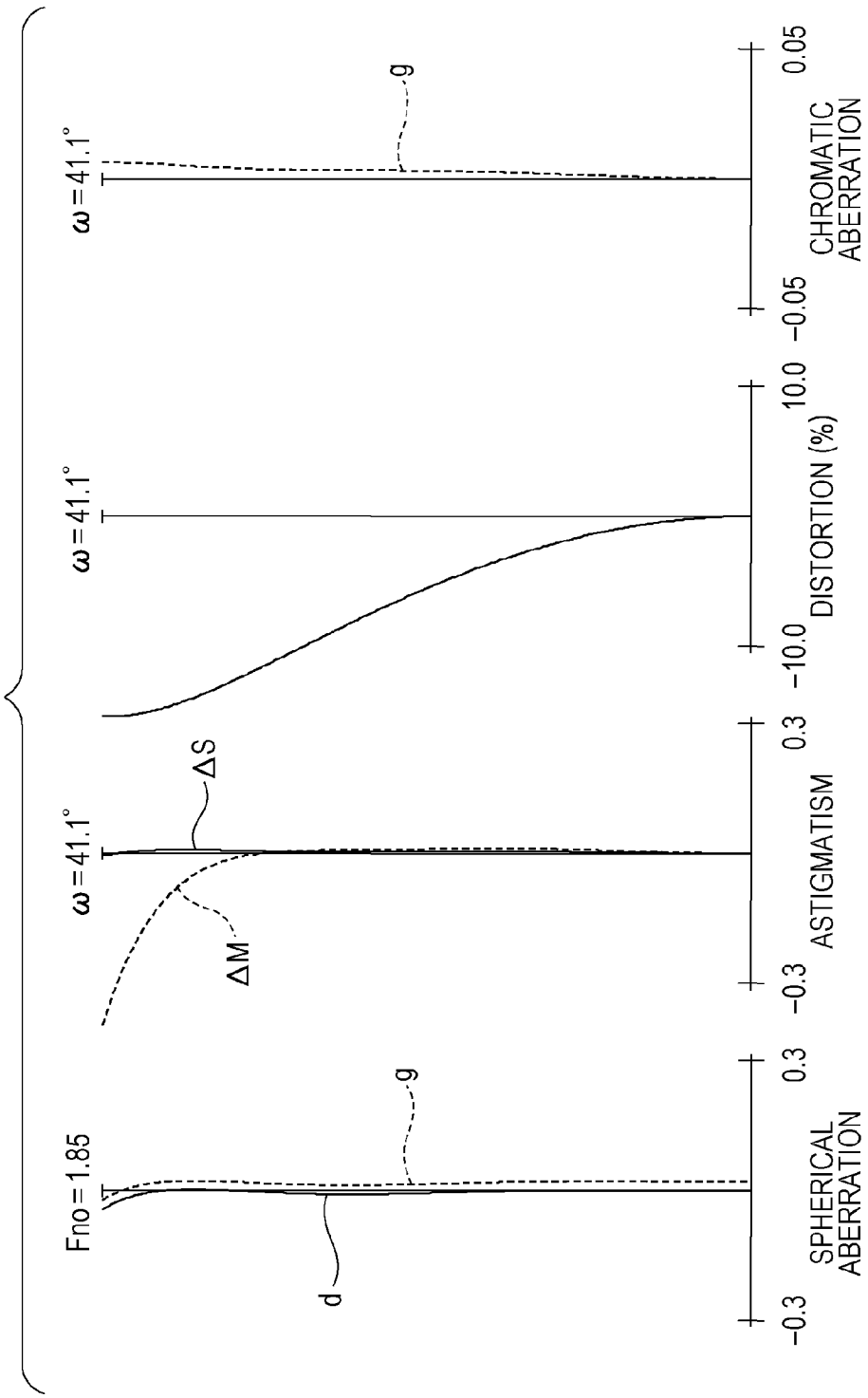

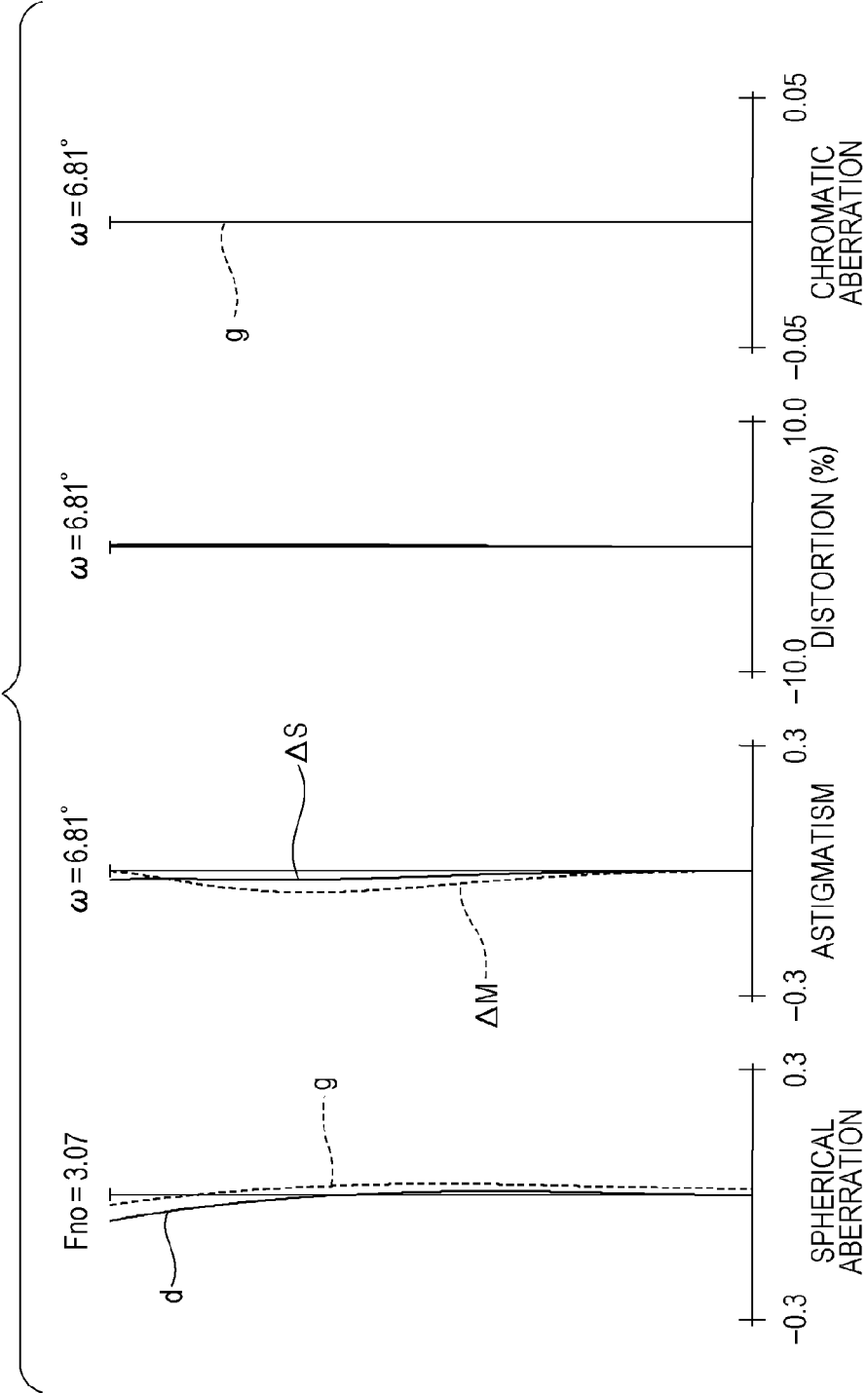

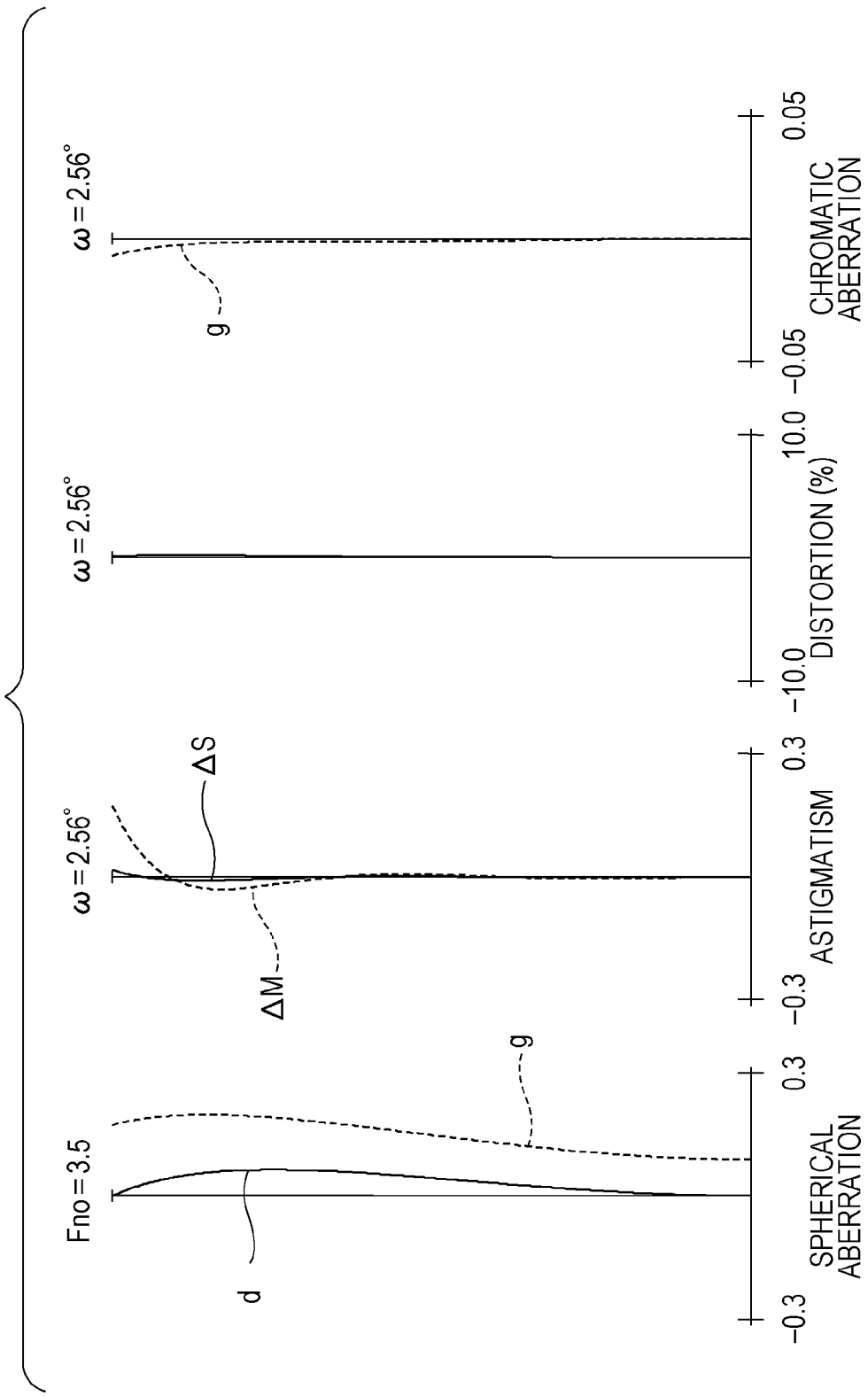

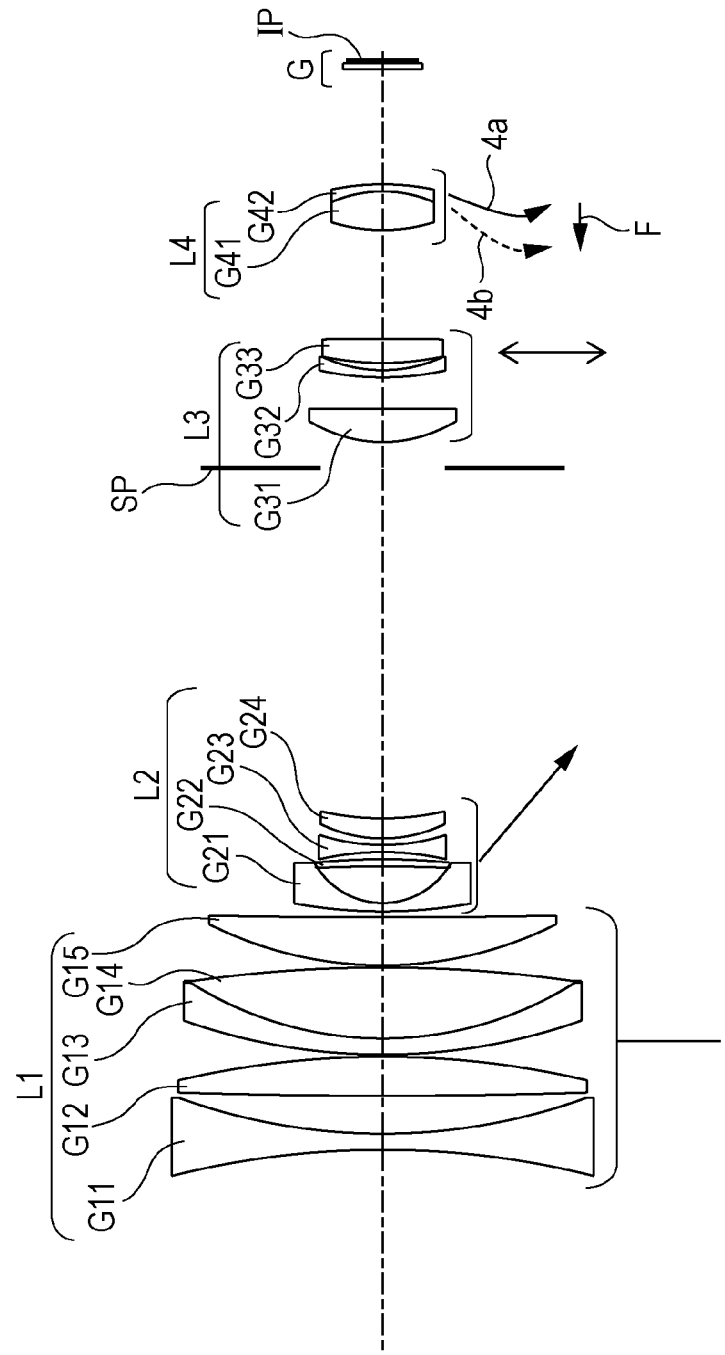

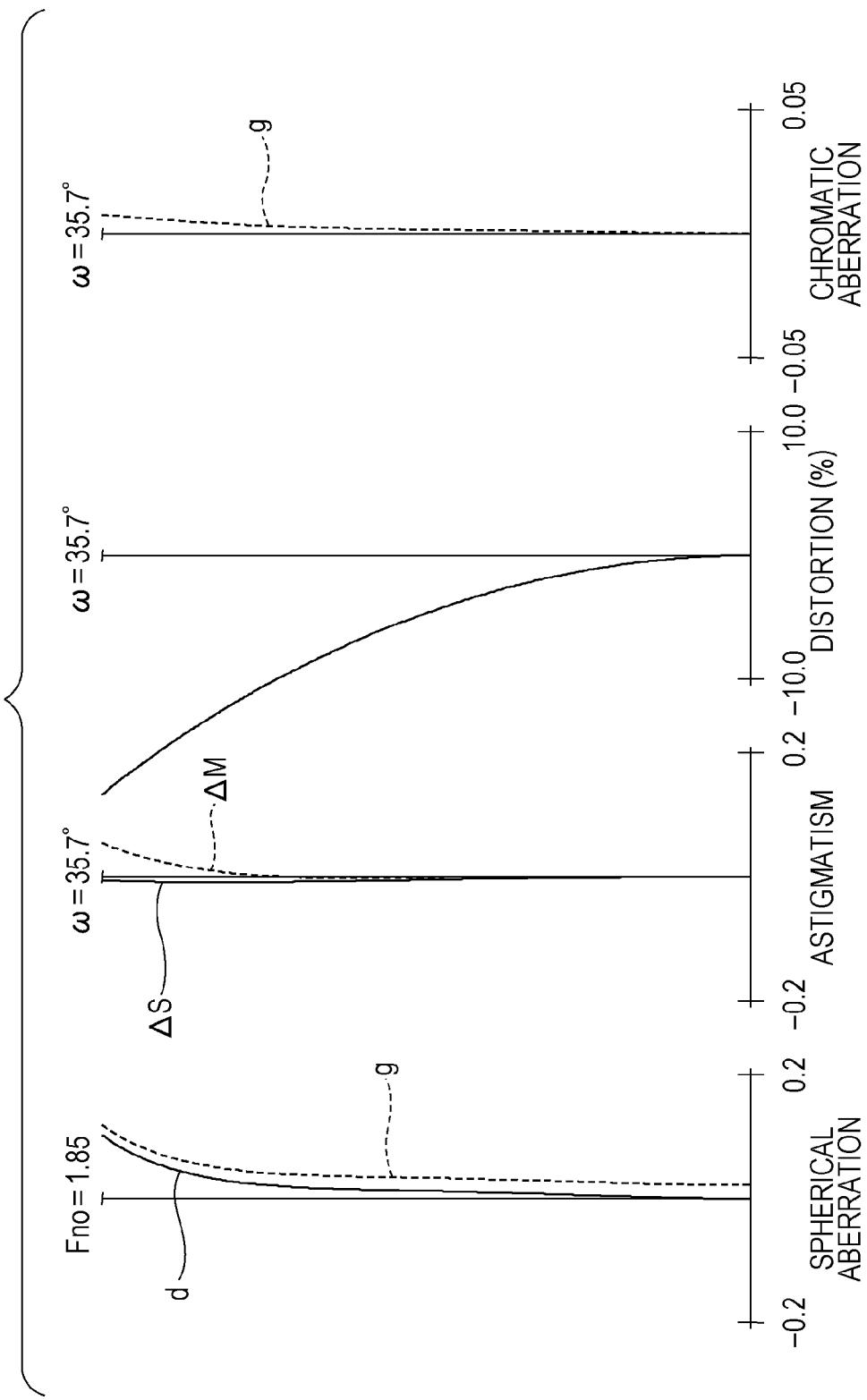

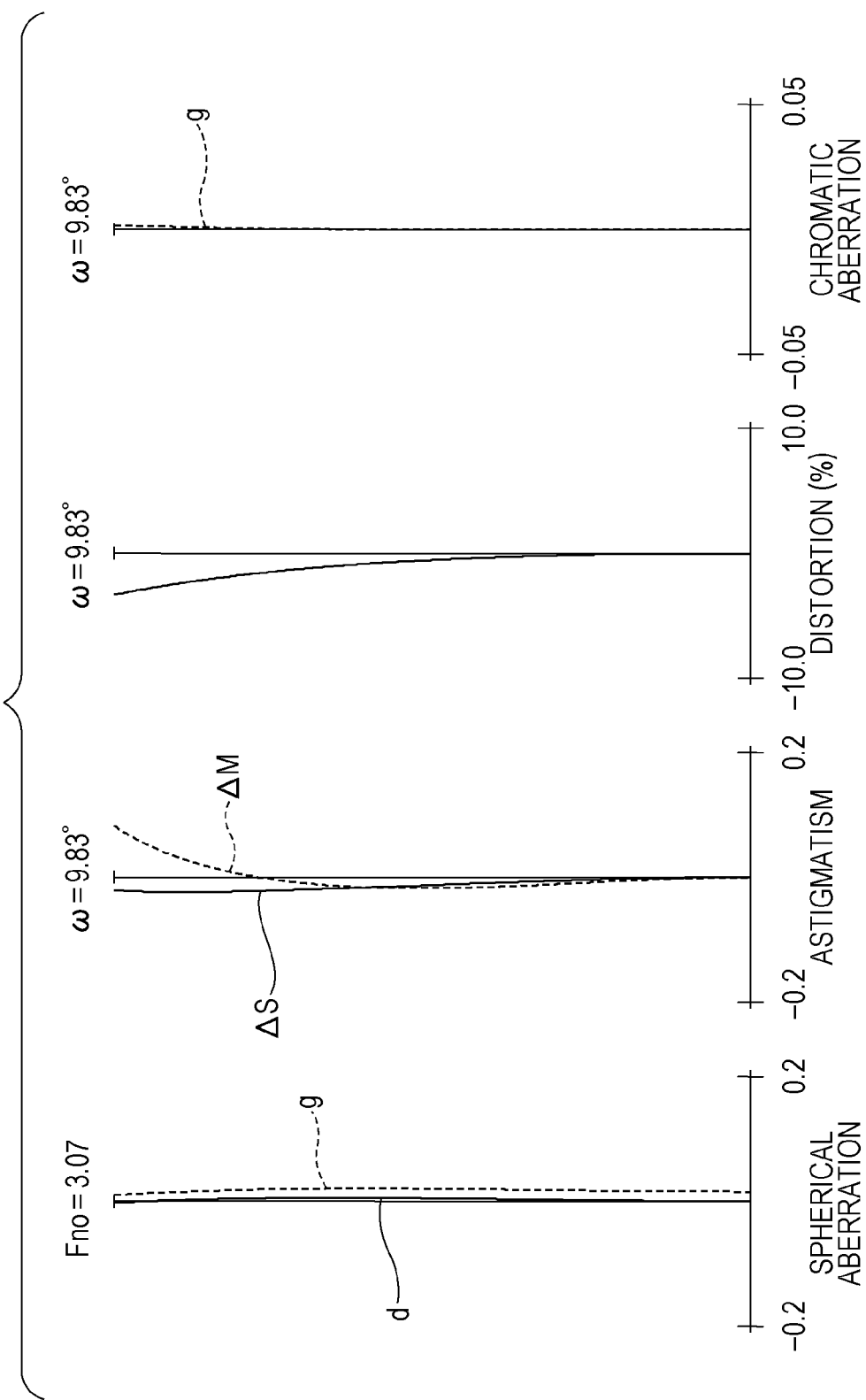

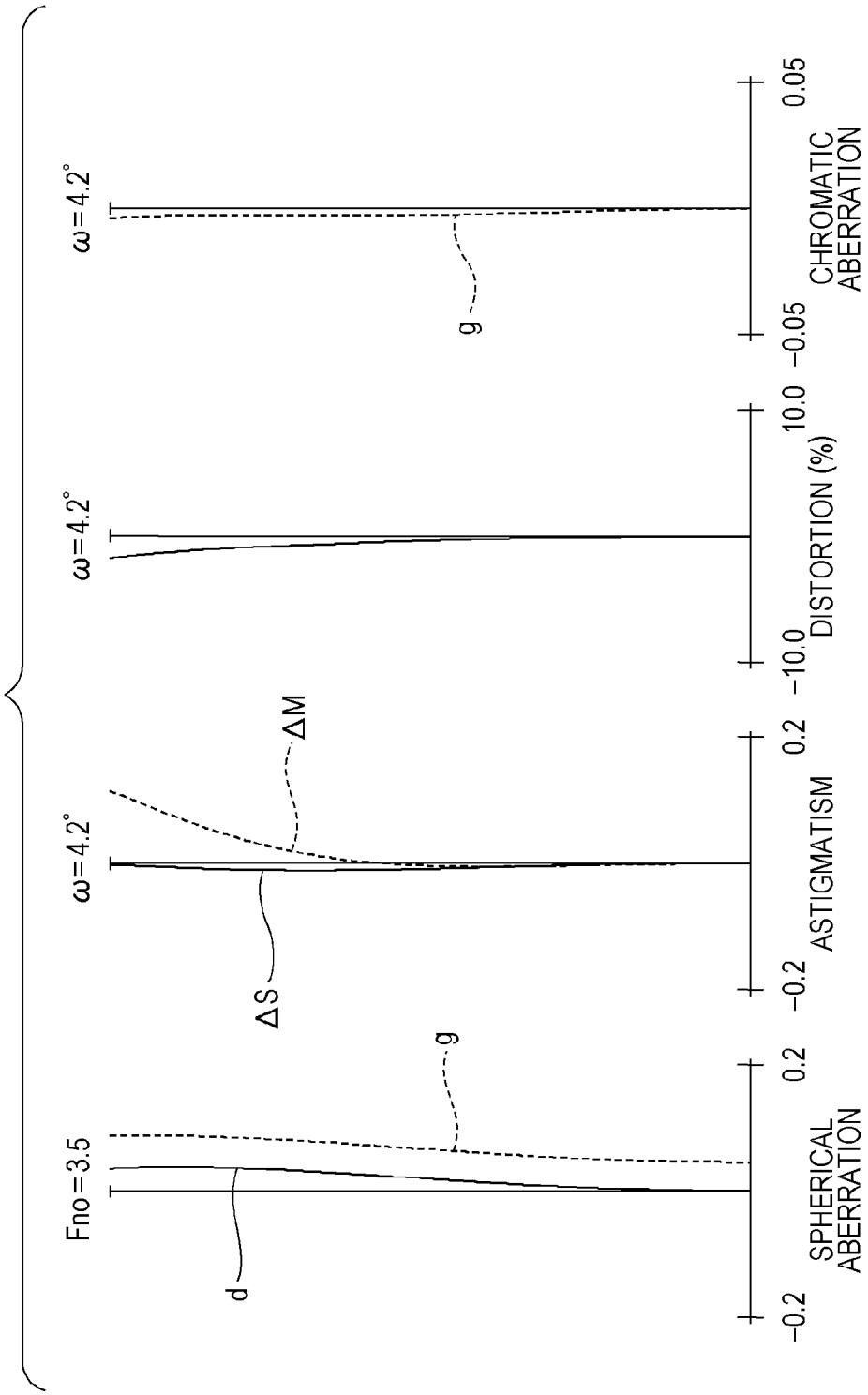

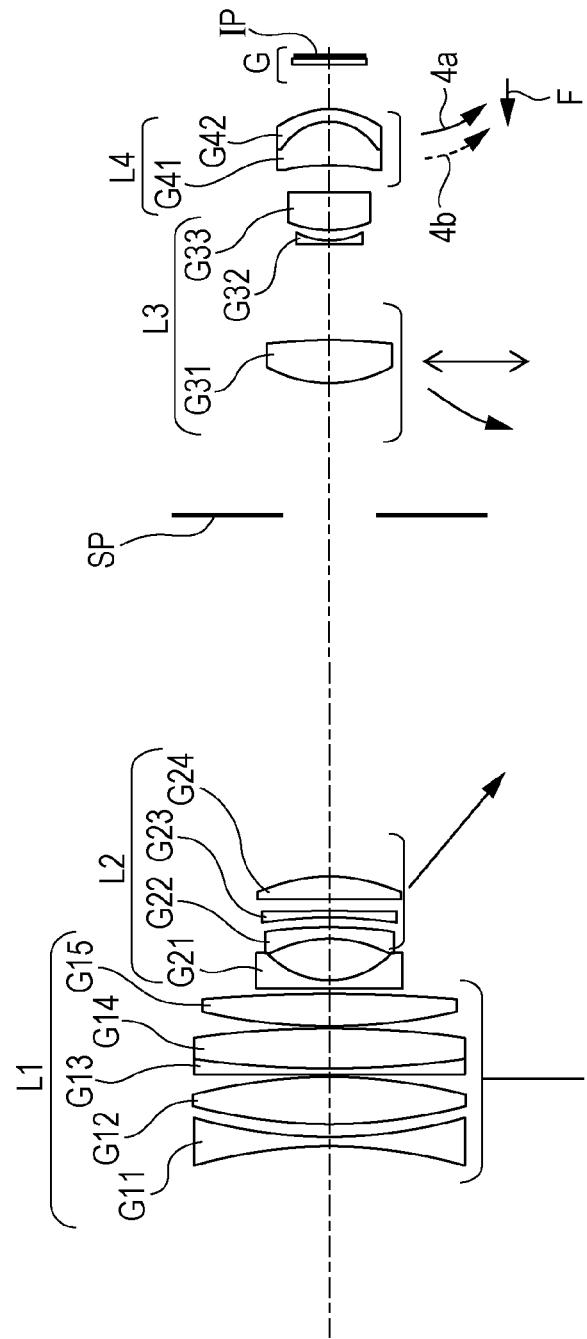

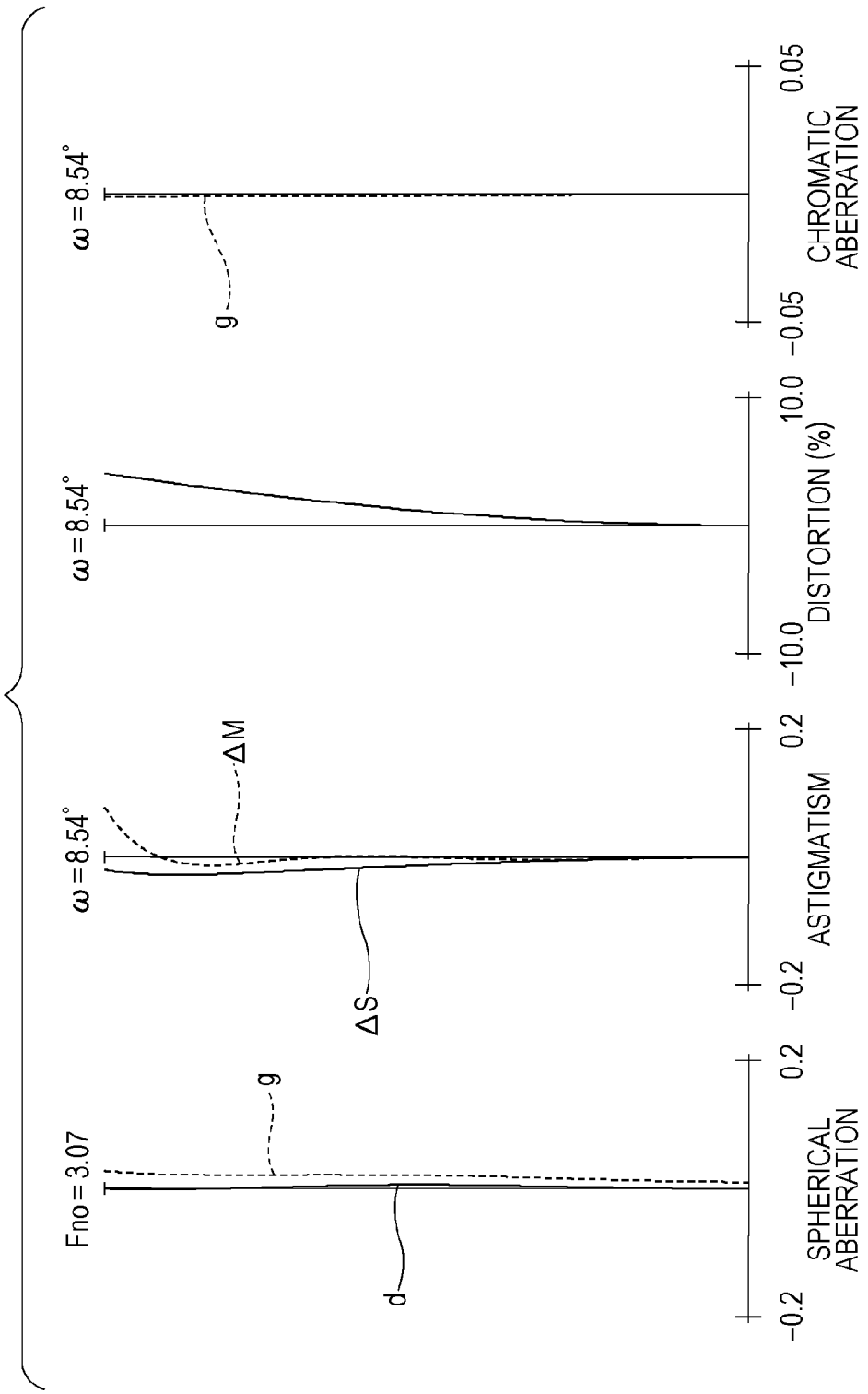

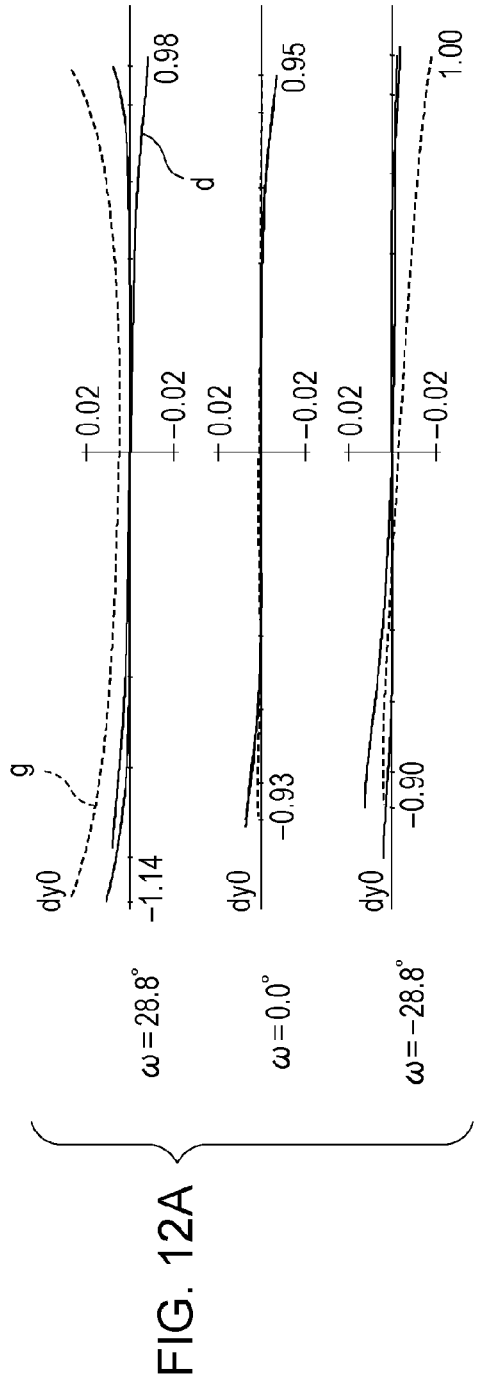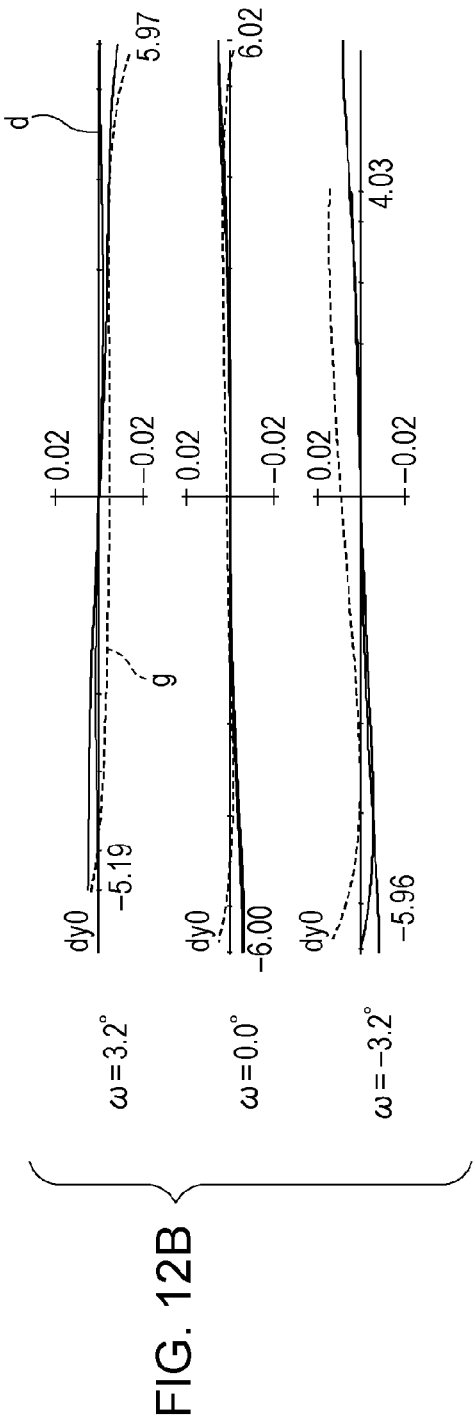

ZOOM LENS AND IMAGE PICKUP APPARATUS EQUIPPED WITH ZOOM LENS

BACKGROUND OF THE INVENTION

1. Field of the Invention

The present invention relates to a zoom lens, which is suitable as an image pickup lens used in an image pickup apparatus.

2. Description of the Related Art

In order to fully utilize the potential of newly developed solid-state image pickup sensors, a compact zoom lens having a wide angle of view and a high zoom ratio over the entire zoom range is desired. Specifically, a zoom lens which is compact, has a wide angle of view, and offers a high zoom ratio would advantageously allow for the production of a small-sized and highly efficient photographic optical system used in an image pickup apparatus. In addition, a zoom lens having high optical performance over the entire zoom range can easily support new high-definition solid-state image pickup sensors.

A variety of zoom lenses are currently known. In particular, four-unit zoom lenses including first to fourth lens units having refractive powers of positive, negative, positive, and positive in order from an object side to an image side are widely known.

Among the four-unit zoom lenses, a rear-focus-type four-unit zoom lens is known. The four-unit rear-focus-type zoom lens is most generally configured to perform zooming by moving the second lens unit alone or by moving the second and third lens units. In addition, the four-unit rear-focus-type zoom lens can correct an image plane variation caused by the zooming by moving the fourth lens unit, and can perform focusing. U.S. Pat. No. 7,463,427, Japanese Unexamined Patent Application Publication No. 2002-244045 disclose four-unit rear-focus-type zoom lenses as described above.

In order to realize a wide angle of view, a high zoom ratio and a high optical performance over the entire zoom range, it is important to appropriately set the zoom type, the refractive powers of the respective lens units, the lens configurations of the respective lens units. In particular, in the case of the four-unit rear-focus-type zoom lens, it is important to appropriately set the positional relationship between the first lens unit and the second lens unit on an optical axis, the refractive powers of the first and third lens units, and the lens configuration of the first lens unit. Furthermore, appropriate setting of an amount of movement in association with zooming and imaging magnification of the second and third zoom lens units is important.

SUMMARY OF THE INVENTION

The present invention provides a zoom lens being compact in entire system, having a wide angle of view and a high zoom ratio, and having a high optical performance over an entire zoom range, and an image pickup apparatus having the zoom lens.

Embodiments of the present invention disclose a zoom lens including a first lens unit having a positive refractive power, a second lens unit having a negative refractive power, an aperture stop, a third lens unit having a positive refractive power, and a fourth lens unit having a positive refractive power in order from an object side to an image side. During zooming from the wide angle end to the telephoto end, the first lens unit is fixed, and the second and fourth lens units are moved so that a distance between the first lens unit and the second lens unit is increased and a distance between the second lens unit and the third lens unit is decreased. The first lens unit includes a first negative lens, a first positive lens, a second negative lens, a second positive lens, and a third positive lens in order from the object side to the image side, the third and fourth lens units include two or more lenses. When f1 and f3 are focal lengths of the first and third lens units, fw is a focal length of the entire system at the wide angle end, T1 is a thickness of the first lens unit on an optical axis, and H12 is a distance between principal points between the first lens unit and the second lens unit at the wide angle end, conditional expressions:

$-5.0 < H12/fw < -0.2$ $1.5 < f1/f3 < 4.0$ $2.0 < T1/fw < 10.0$ are satisfied.

Further features of the present invention will become apparent from the following description of exemplary embodiments with reference to the attached drawings.

BRIEF DESCRIPTION OF THE DRAWINGS

FIGS. 2A, 2B and 2C are aberration charts showing various aberrations of the zoom lens at the wide angle end, an intermediate zoom position, and a telephoto end, respectively, according to Embodiment 1.

FIGS. 4A, 4B, and 4C are aberration charts showing various aberrations of the zoom lens at the wide angle end, an intermediate zoom position, and a telephoto end, respectively, according to Embodiment 2.

FIG. 5 is a cross-sectional view of a zoom lens at a wide angle end according to Embodiment 3.

FIGS. 6A, 6B, and 6C are aberration charts showing various aberrations of the zoom lens at the wide angle end, an intermediate zoom position, and a telephoto end, respectively, according to Embodiment 3.

FIG. 7 is a cross-sectional view of lenses of a zoom lens at a wide angle end according to Embodiment 4.

FIGS. 8A, 8B, and 8C are aberration charts showing various aberrations of the zoom lens at the wide angle end, an intermediate zoom position, and a telephoto end, respectively, according to Embodiment 4.

FIG. 9 is a cross-sectional view of lenses of a zoom lens at a wide angle end according to Embodiment 5.

FIGS. 10A, 10B and 10C are aberration charts showing various aberrations of the zoom lens at the wide angle end, an intermediate zoom position, and a telephoto end, respectively, according to Embodiment 5.

FIGS. 12A and 12B are lateral aberration charts of the zoom lens, respectively, at the wide angle end and the telephoto end at the time of image stabilization, according to Embodiment 1.

DESCRIPTION OF THE EMBODIMENTS

Figure 1:
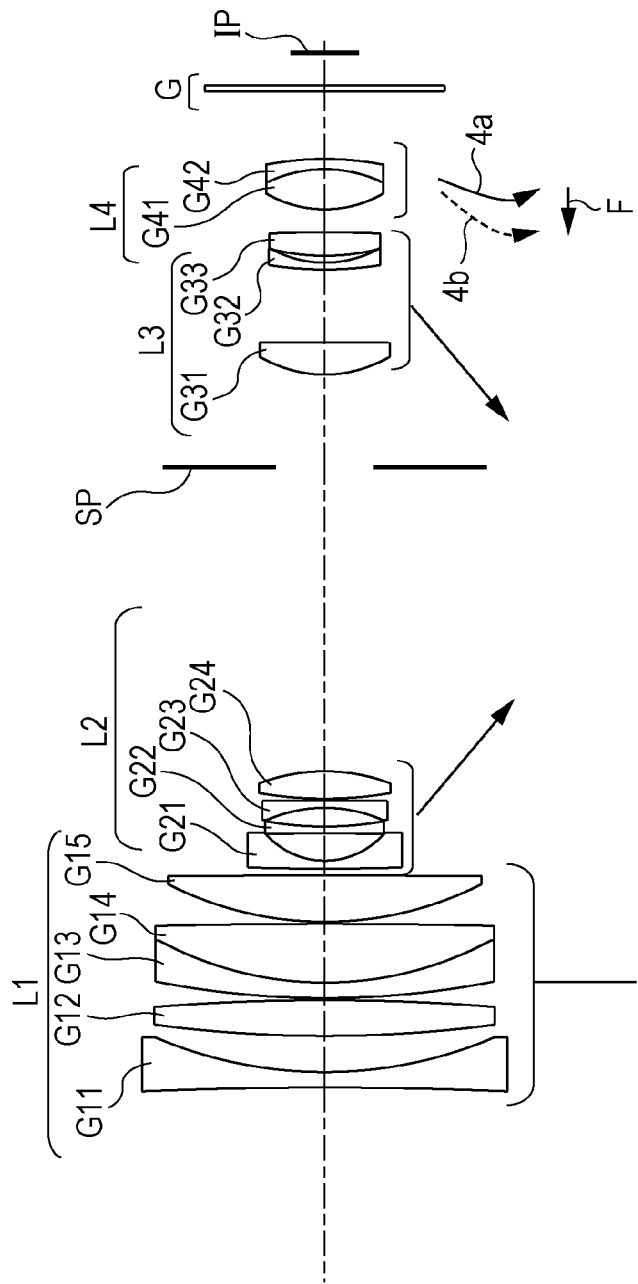
FIG. 1 is a cross-sectional view of lenses of a zoom lens at a wide angle end according to Embodiment 1.

Referring now to the drawings, embodiments of a zoom lens according to the invention and an image pickup apparatus having the zoom lens will be described. The zoom lens described in the various embodiments includes a first lens unit having a positive refractive power, a second lens unit having a negative refractive power, a third lens unit having a positive refractive power, and a fourth lens unit having a positive refractive power. The first, second, third and fourth lens units are arranged in order from an object side to an image side along an optical axis (illustrated by a dash-dot line in the Figures) of the zoom lens. At the time of zooming, the first lens unit is fixed, and at least the second and fourth lens units move along the optical axis. A lens unit having a refractive power may be arranged on at least one of the object side of the first lens unit or the image side of the fourth lens unit.

Figure 3:
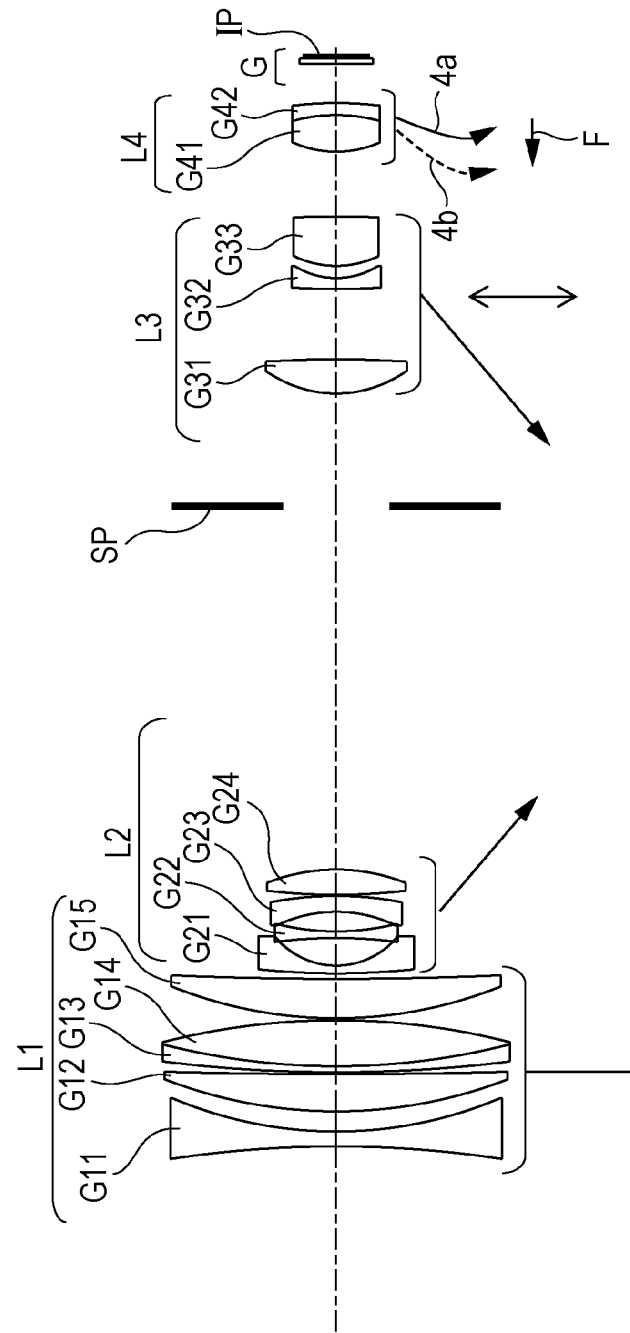
FIG. 3 is a cross-sectional view of lenses of a zoom lens at a wide angle end according to Embodiment 2.

FIG. 1 is a cross-sectional view of lenses of a zoom lens according to Embodiment 1 of the invention at a wide angle end (end of short focal length). FIGS. 2A, 2B, and 2C are aberration charts of the zoom lens according to Embodiment 1 at the wide angle end, an intermediate zoom position, and a telephoto end (end of long focal length), respectively. FIG. 3 is a cross-sectional view of lenses of a zoom lens according to Embodiment 2 of the invention at a wide angle end, and FIGS. 4A, 4B, and 4C are aberration charts of the zoom lens according to Embodiment 2 at the wide angle end, an intermediate zoom position, and a telephoto end, respectively.

FIG. 5 is a cross-sectional view of lenses of a zoom lens according to Embodiment 3 of the invention at a wide angle end, and FIGS. 6A, 6B, and 6C are aberration charts of the zoom lens according to Embodiment 3 at the wide angle end, an intermediate zoom position, and a telephoto end, respectively. FIG. 7 is a cross-sectional view of lenses of a zoom lens according to Embodiment 4 of the invention at a wide angle end, and FIGS. 8A, 8B, and 8C are aberration charts of the zoom lens according to Embodiment 4 at the wide angle end, an intermediate zoom position, and a telephoto end, respectively.

Figure 10A:
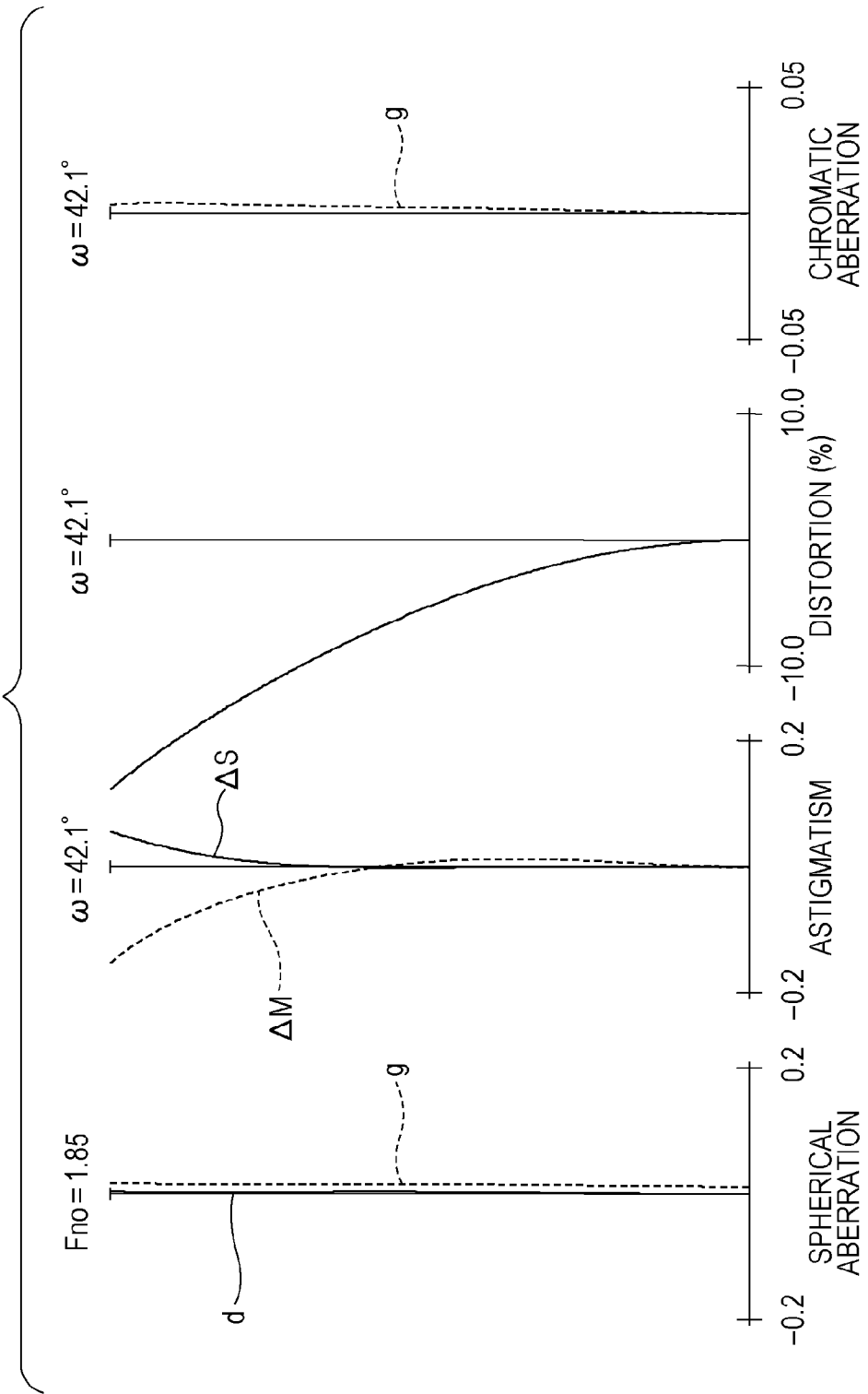
Figure 10C:
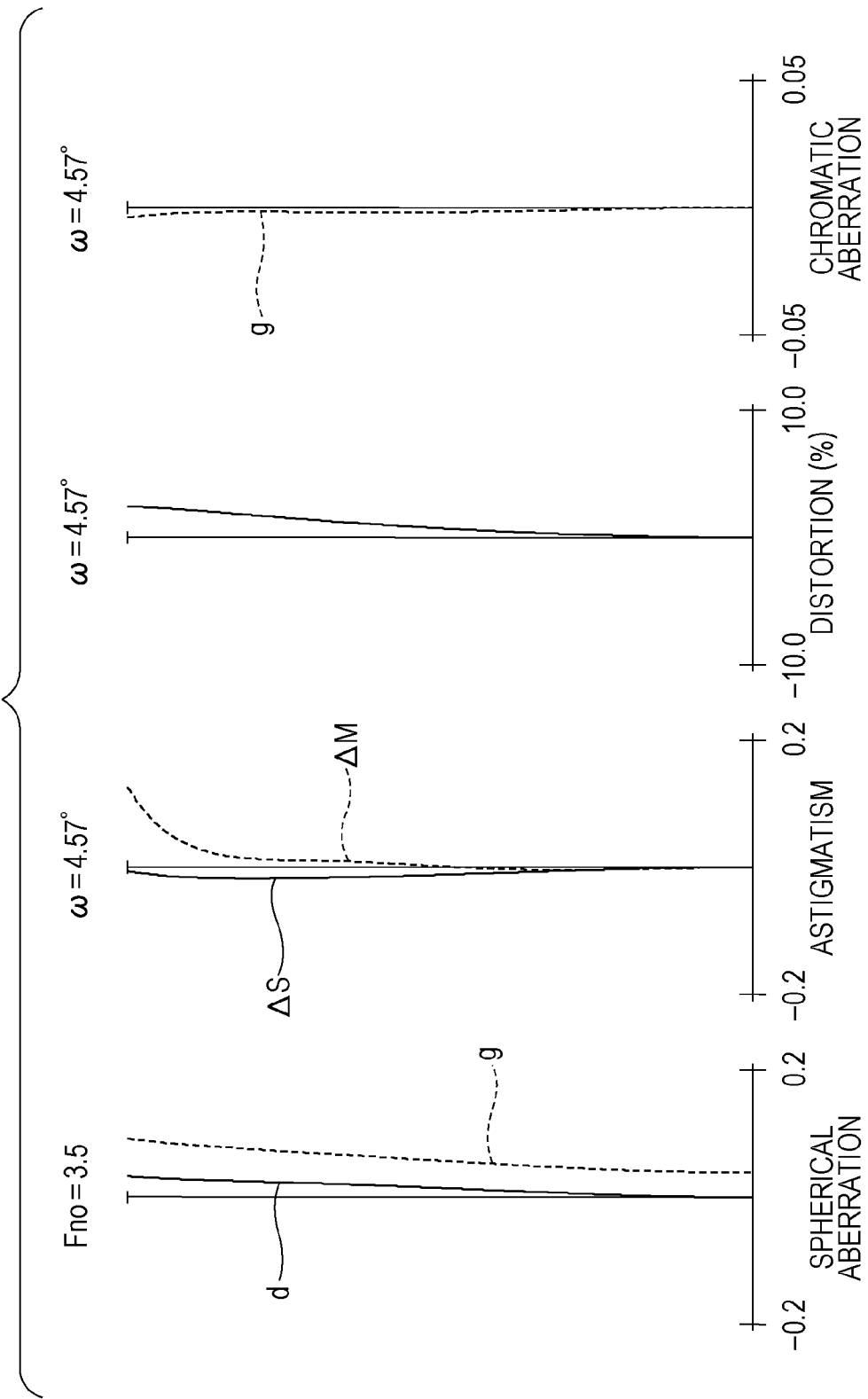
Figure 11A:
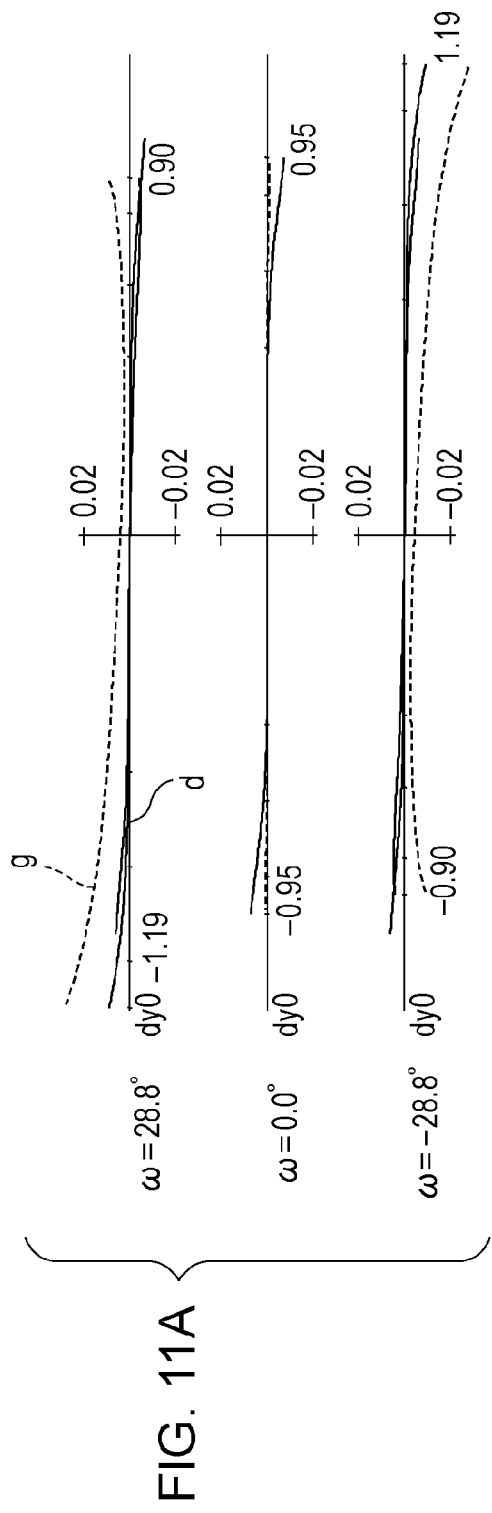
FIGS. 11A and 11B are lateral aberration charts of the zoom lens, respectively, at the wide angle end and a telephoto end in a standard state, according to Embodiment 1.
Figure 11B:
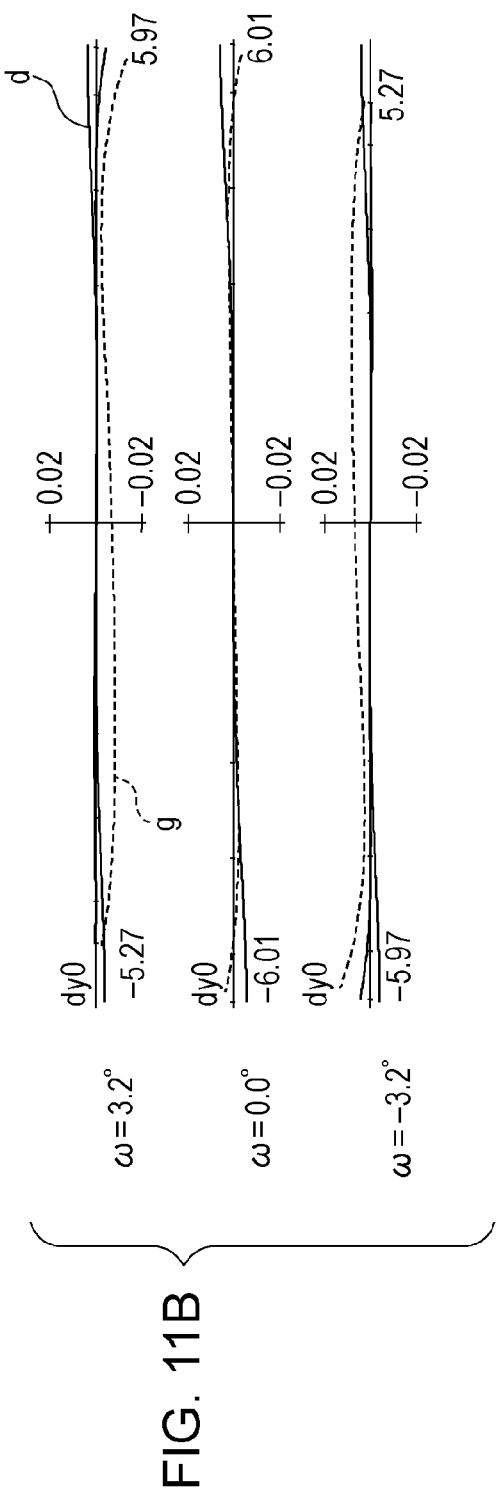
Figure 13:
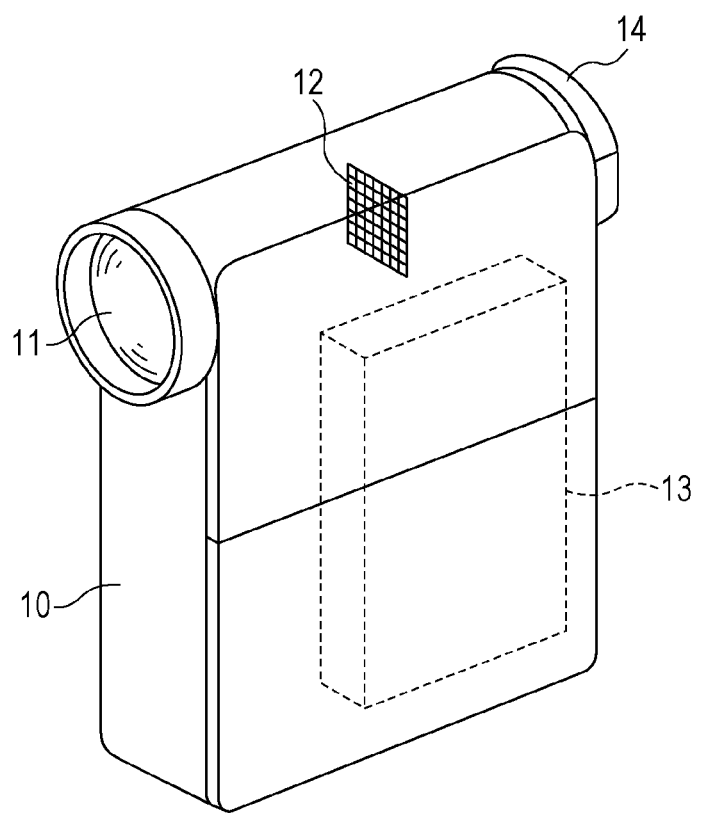
FIG. 13 is a schematic view of relevant part of a video camera as an example of an image pickup apparatus according to an embodiment of the invention.

FIG. 9 is a cross-sectional view of lenses of a zoom lens according to Embodiment 5 of the invention at a wide angle end, and FIGS. 10A, 10B, and 10C are aberration charts of the zoom lens according to Embodiment 5 at the wide angle end, an intermediate zoom position, and a telephoto end, respectively. FIGS. 11A and 11B are lateral aberration charts of the zoom lens according to Embodiment 1 at the wide angle end and the telephoto end respectively in a standard state without being applied with image stabilization. FIGS. 12A and 12B are lateral aberration charts of the zoom lens according Embodiment 1 under the image stabilization of 3° (3 degrees) at the wide angle end and of 0.3° (0.3 degrees) at the telephoto end respectively. FIG. 13 is a schematic view of a principal portion of a video camera (image pickup apparatus) having the zoom lens of the invention mounted thereon.

The zoom lenses according to Embodiment 1 to 5 are an image taking optical system used in the image pickup apparatus. In the cross-sectional view of the lenses, the left side is the object side and the right side is the image side. In the cross-sectional view of the lenses, L1 denotes a first lens unit having a positive refractive power, L2 denotes a second lens unit having a negative refractive power, and L3 denotes a third lens unit having a positive refractive power, and L4 denotes a fourth lens unit having a positive refractive power. Reference symbol SP denotes an aperture stop, which is located on the object side of the third lens unit L3 and is fixed or movable at the time of zooming.

Reference symbol G denotes an optical block corresponding to an optical filter, a face plate, and so on. Reference symbol IP denotes an image plane, which corresponds to an imaging plane of a solid-state image pickup apparatus such as a CCD sensor or a CMOS sensor when used as a photographic optical system such as a digital still camera or the video camera. Alternatively, IP corresponds to a film plane in the case of a camera using a silver-halide film. In spherical aberration charts, reference symbols d and g denote Fraunhofer d line and g line, respectively. In astigmatism charts, ΔM, ΔS indicate a meridional image plane and a sagittal image plane on the line d, respectively. The line d is shown in distortion aberration, and the aberration of the line g with respect to the line d is shown in lateral chromatic aberration. Fno denotes an F number, and ω denotes a half angle of view.

The wide angle end and the telephoto end in the respective embodiments described below mean zoom positions at which a zoom lens unit (second lens unit) is located. For example, at the wide angle end, the zoom lens unit is located at one end of a movable range on the optical axis of the mechanism, and at the telephoto end, the zoom lens unit is located at the opposite end of the movable range on the optical axis. In the respective embodiments, the second lens unit L2 is moved toward the image as indicated by an arrow at the time of zooming from the wide angle end to the telephoto end. The zooming is performed by moving the third lens unit L3 toward the object along a monotonous or convex locus. Also, an image plane variation in association with the zooming is corrected by moving the fourth lens unit L4 toward the object along the convex locus. The third lens unit L3 may be fixed at the time of zooming.

At the time of zooming from the wide angle end to the telephoto end, the second lens unit L2 is moved toward the image, the third lens unit L3 is moved toward the object, and the fourth lens unit L4 is moved toward the object along the convex locus in Embodiment 1, 2, 3 shown in FIG. 1, FIG. 3, and FIG. 5. In Embodiment 4 shown in FIG. 7, the second lens unit L2 is moved toward the image, and the fourth lens unit L4 is moved toward the object along the convex locus. In Embodiment 5 shown in FIG. 9, the second lens unit L2 is moved toward the image, the third lens unit L3 is moved toward the object along the convex locus, and the fourth lens unit L4 is moved toward the image.

Also, a rear-focusing type in which the fourth lens unit L4 is moved on the optical axis for focusing is employed. A solid curved line 4a and a broken curved line 4b relating to the fourth lens unit L4 are movement loci for correcting the image plane variations caused by zooming when focusing on an object at infinity and a near object, respectively. When focusing from the object at infinity to the near object at the telephoto end, the fourth lens unit L4 is moved forward as indicated by an arrow F.

Also, at the time of shooting, a shot image is moved in the vertical direction with respect to the optical axis by moving the entirety or part of the third lens unit L3 so as to have a component in the vertical direction with respect to the optical axis. Accordingly, the shaking of the shot image caused by vibrations of the zoom lens is corrected. In other words, image stabilization is achieved. FIGS. 11A and 11B are lateral aberration charts showing a standard state without being applied with the image stabilization in Embodiment 1. It is understood that the lateral aberration at the wide angle end (image stabilization of 3°) and the telephoto end (image stabilization of 0.3°) when the image stabilization is performed in the entire third lens unit L3 is satisfactorily corrected in Embodiment 1 from FIGS. 12A and 12B. Each of the zoom lenses in the respective embodiments includes the first lens unit L1 having a positive refractive power, the second lens unit L2 having a negative refractive power, an aperture stop, the third lens unit L3 having a positive refractive power, and the fourth lens unit L4 having a positive refractive power in order from the object side to the image side.

At the time of zooming from the wide angle end to the telephoto end, the first lens unit L1 is fixed. The second and fourth lens units L2, L4 are moved so that a distance between the first lens unit L1 and the second lens unit L2 is increased and a distance between the second lens unit L2 and the third lens unit L3 is zoom position. The first lens unit L1 includes a first negative lens G11, a first positive lens G12, a second negative lens G13, a second positive lens G14, and a third positive lens G15 in this order from the object side toward the image side. The third and fourth lens units L3, L4 include two or more lenses.

Focal lengths of the first and third lens units L1, L3 are denoted by f1, f3, respectively. The focal length of an entire system at the wide angle end is denoted by fw. A thickness of the first lens unit L1 on the optical axis is denoted by T1. A distance between principal points of the first lens unit L1 and the second lens unit L2 at the wide angle ends is denoted by H12. At this time, conditional expressions;

$$-5.0 < H12/fw < -0.2 \tag{1}$$

$$1.5 < f1/f3 < 4.0 \tag{2}$$

$$2.0 < T1/fw < 10.0 \tag{3}$$

are satisfied.

In the respective embodiments, the zoom lens includes the lens units having the refractive powers of positive, negative, positive and positive in order from the object side to the image side, and conditions of movement of the respective lens units at the time of zooming, a lens configuration of the first lens unit L1, and a ratio of the focal lengths between the first lens unit L1 and the third lens unit L3, and so on are set appropriately as described above. Accordingly, a satisfactory optical performance is achieved in an entire zoom range while achieving a wide angle of view, a high zoom ratio, and reduction in size of the entire system. In particular, reduction of a front lens effective diameter can easily achieved while correcting various aberrations satisfactorily by arranging the position of an entrance pupil on the object side.

The first lens unit L1 is configured as described above. In particular, in order to achieve the wide angle of view easily while reducing the front lens effective diameter, the negative lens (G11) is placed at a position closest to the object. Then, by bending a light beam coming out from the first lens significantly, a curvature of field generated by the first lens is corrected. By configuring the third and fourth lens units L3, L4 to have two or more lenses, the satisfactory performance is maintained in the entire zoom range irrespective of the reduction in the size of the entire system, and chromatic aberration, the curvature of field, and so on generated at the time of zooming is satisfactorily corrected.

The conditional expression (1) here is for setting the ratio between the distance between the principal points of the first lens unit L1 and the second lens unit L2 and the focal length of the entire system at the wide angle end appropriately. The conditional expression (1) is also intended to obtain a zoom lens being compact in the entire system and having not only a wide angle of view, but also a satisfactory optical performance over the entire zoom range.

If values exceed an upper limit value of the conditional expression (1), the distance between the principal points of the first lens unit L1 and the second lens unit L2 at the wide angle end becomes too long, and thus an entire length and the front lens effective diameter are increased correspondingly. If the values are below a lower limit value of the conditional expression (1), the distance between the principal points of the first lens unit L1 and the second lens unit L2 at the wide angle end becomes too short, and thus reduction of longitudinal chromatic aberration at the telephoto end and fluctuations of the curvature of field in the entire zoom range becomes difficult.

The conditional expression (2) is for setting the focal lengths of the first lens unit L1 and the third lens unit L3 appropriately. The conditional expression (2) is also intended to obtain a zoom lens being compact in the entire system having not only a wide angle of view, but also a satisfactory optical performance over the entire zoom range. If the values exceed the upper limit value of the conditional expression (2), the focal length of the first lens unit L1 becomes too long, and thus the entire length and the front lens effective diameter are increased correspondingly. If the values are below the lower limit value of the conditional expression (2), the focal length of the first lens unit L1 becomes too short, and thus the reduction of the astigmatism, coma aberration, and the fluctuations of the curvature of field in the entire zoom range becomes difficult.

The conditional expression (3) is for setting the ratio between the thickness of the first lens unit on the optical axis and the focal length at the wide angle end appropriately. The conditional expression (3) is also intended to obtain a zoom lens being compact in the entire system having not only a wide angle of view, but also a satisfactory optical performance over the entire zoom range. If the values exceed the upper limit value of the conditional expression (3), the thickness of the first lens unit L1 on the optical axis becomes too long, and thus the entire length and the front lens effective diameter are increased correspondingly. If the values are below the lower limit value of the conditional expression (3), the thickness of the first lens unit L1 on the optical axis becomes too thin, and the sufficient thickness of an edge portion of the positive lens cannot be secured easily, so that the manufacture becomes difficult.

The ranges of the values of the conditional expressions (1) to (3) are preferably set as follows. First of all, the range of the values of the conditional expression (1) is preferably set as follows.

$$-3.5 < H12/fw < -0.3 \tag{1a}$$

By setting the values in the range of the conditional expression (1a), the distance between the principal points of the first lens unit L1 and the second lens unit L2 at the wide angle end can be set further appropriately. Therefore, increase in the entire length and the front lens effective diameter can easily be held down. In the same manner, the longitudinal chromatic aberration at the telephoto end and the fluctuations of curvature of field in the entire zoom range can easily be reduced. The range of the values of the conditional expression (2) is preferably set as follows.

$$1.5 < f1/f3 < 2.1 \tag{2a}$$

By setting the values in the range of the conditional expression (2a), the ratio of the focal lengths between the first lens unit L1 and the third lens unit L3 can be set further appropriately, and thus the increase in the entire length and the front lens effective diameter can easily be held down. Also, the astigmatism, the coma aberration, and the fluctuations of the curvature of field in the entire zoom range can easily be reduced. The range of the values of the conditional expression (3) is preferably set as follows.

$$4.0 < T1/fw < 5.5 \tag{3a}$$

By setting the values in the range of the conditional expression (3a), the ratio between the thickness of the first lens unit L1 on the optical axis and the focal length of the entire system at the wide angle end can be set further appropriately. Therefore, the increase in the entire length and the front lens effective diameter can easily be held down. The thickness of the edge portion can easily be secured, and thus the manufacture is easily achieved.

Accordingly, in the respective embodiments, a zoom lens in which the various aberrations are satisfactorily corrected in the entire zoom range while achieving compactness, the wide angle of view, and the high zoom ratio can easily be obtained.

The zoom lens in the invention is realized by satisfying the configuration described above. However, in order to maintain better optical performance while maintaining the high zoom ratio and the reduction in the size of the entire system, it is preferable to satisfy at least one of the following conditional expressions. An air-equivalent length of back-focus at the wide angle end is denoted by BFW. The entire length of the lenses in the entire system is denoted by TD. Here, the entire length of the lenses means the distance from the first lens plane to the last lens plane added with the air-equivalent length of the back-focus. The difference in position between the wide angle end and the telephoto end of the second lens unit L2 on the optical axis is denoted by M2. The positional difference of the wide angle end and the telephoto end of the third lens unit L3 on the optical axis is denoted by M3.

As regards the positional difference, a minus sign is allocated when the lens unit is moved to a position nearer the object at the telephoto end than at the wide angle end and a plus sign is allocated when the lens unit is moved to a position nearer the image. In Embodiment 4, since the third lens unit L3 is fixed, the positional difference M3 is zero. Lateral magnifications of the second lens unit L2 at the wide angle end and the telephoto end are denoted by β2w and β2t respectively. The lateral magnifications of the third lens unit L3 at the wide angle end and the telephoto end are denoted by β3w and β3t. The focal length of the second lens unit L2 is denoted by f2.

At this time, it is preferable that at least one of the conditional expressions:

$$0.5 < BFw/fw < 10.0 \quad (4)$$

$$15.0 < TD/fw < 40.0 \quad (5)$$

$$0.0 \leq |M3/M2| < 1.5 \quad (6)$$

$$0.0 \leq |M3|/fw < 10.0 \quad (7)$$

$$5.0 < f1/fw < 15.0 \quad (8)$$

$$1.0 < (\beta 2t/\beta 2w)/(\beta 3t/\beta 3w) < 5.0 \quad (9)$$

$$2.0 < |M2/f2| < 3.5 \quad (10)$$

is satisfied.

The conditional expression (4) is for setting the ratio between the back-focus at the wide angle end and the focal length of the entire system at the wide angle end appropriately. The conditional expression (4) is also intended to obtain a zoom lens being compact in the entire system having not only a wide angle of view, but also a satisfactory optical performance over the entire zoom range. If the values exceed the upper limit value of the conditional expression (4), the back-focus at the wide angle end becomes too long, and thus the entire length and the front lens effective diameter are increased correspondingly. If the values are below the lower limit value, the buck-focus at the wide angle end becomes too short, and thus arrangement of an optical member such as an optical filter between the final lens and the image plane becomes difficult.

The conditional expression (5) is for setting the ratio between the length from the first lens plane on the object side to the image plane and the focal length of the entire system at the wide angle end appropriately. The conditional expression (5) is also intended to obtain a zoom lens being compact in the entire system having not only a wide angle of view, but also a satisfactory optical performance over the entire zoom range. If the values exceed the upper limit value of the conditional expression (5), the length from the first lens plane on the object side to the image plane becomes too long, and thus the front lens effective diameter is increased correspondingly. If the values are below the lower limit value of the conditional expression (5), the refractive powers of the respective lens units become too strong and the longitudinal chromatic aberration is increased at the telephoto end and, in addition, the reduction of the fluctuation of the curvature of field in the entire zoom range becomes difficult.

The conditional expression (6) is for setting the ratio between the distance of movement of the third lens unit L3 at the time of zooming from the wide angle end to the telephoto end and the distance of movement of the second lens unit L2 at the time of zooming from the wide angle end to the telephoto end appropriately. The conditional expression (6) is also intended to obtain a zoom lens being compact in the entire system having not only a wide angle of view, but also a satisfactory optical performance over the entire zoom range. When the third lens unit L3 is fixed at the time of zooming, M3=0 is satisfied.

If the values exceed the upper limit value of the conditional expression (6), the distance of movement of the second lens unit L2 becomes too short with respect to the distance of movement of the third lens unit L3, and thus the reduction of the astigmatism, the coma aberration, and the fluctuations of the curvature of field in the entire zoom range becomes difficult. If the values are below the lower limit value, the distance of movement of the second lens unit L2 becomes too long with respect to the distance of movement of the third lens unit L3, and thus the entire length and the front lens effective diameter are increased. The conditional expression (7) is for setting the ratio between the distance of movement of the third lens unit L3 at the time of zooming from the wide angle end to the telephoto end and the focal length of the entire system at the wide angle end appropriately. The conditional expression (7) is also intended to obtain a zoom lens being compact in the entire system having not only a wide angle of view, but also a satisfactory optical performance over the entire zoom range.

If the values exceed the upper limit value of the conditional expression (7), the distance of movement of the third lens unit L3 becomes too long, and thus the reduction of the astigmatism, the coma aberration, and the fluctuations of the curvature of field in the entire zoom range becomes difficult. If the values are below the lower limit value of the conditional expression (7), the distance of movement of the third lens unit L3 becomes too short, and thus the entire length is increased correspondingly.

The conditional expression (8) is for setting the ratio between the focal length of the first lens unit L1 and the focal length of the entire system at the wide angle end appropriately. The conditional expression (8) is also intended to obtain a zoom lens being compact in the entire system having not only a wide angle of view, but also a satisfactory optical performance over the entire zoom range. If the values exceed the upper limit value of the conditional expression (8), the focal length f1 of the first lens unit L1 becomes too large, and thus the correction of the aberration can be achieved easily, but the entire length and the front lens effective diameter are increased correspondingly. If the values are below the lower limit value of the conditional expression (8), the focal length of the first lens unit L1 becomes too small, and thus correction of spherical aberration, the longitudinal chromatic aberration, or the coma aberration at the telephoto end becomes difficult.

The conditional expression (9) is for setting share of zooming ratio between the second lens unit L2 and the third lens unit L3 appropriately. If the zooming ratio is divided into a plurality of lens units, the various aberrations in the entire zoom range can easily be corrected satisfactorily. If the values exceed the upper limit value of the conditional expression (9), the share of zooming ratio of the second lens unit L2 becomes too large, and thus the reduction of the astigmatism, the coma aberration, and the fluctuations of the curvature of field in the entire zoom range becomes difficult. If the values are below the lower limit value of the conditional expression (9), the share of zooming ratio of the third lens unit L3 becomes too large, and thus the entire length and the front lens effective diameter are increased correspondingly.

The conditional expression (10) is for defining the ratio between the distance of movement of the second lens unit L2 and the focal length of the second lens unit L2. If the values exceed the upper limit value of the conditional expression (10), the distance of movement of the second lens unit L2 at the time of zooming becomes too large, and thus the entire length and the front lens effective diameter are increased correspondingly. If the values are below the lower limit value of the conditional expression (10), the distance of movement of the second lens unit L2 at the time of zooming becomes too small, and thus the distance of movement of the third lens unit L3 must be increased in order to obtain a predetermined magnification, so that the entire length and the front lens effective diameter are increased correspondingly. The fluctuations of the aberrations at the time of zooming can be reduced by configuring the second lens unit L2 with a first negative lens G21, a second negative lens G22, a third negative lens G23, and a positive lens G24 in order from the object side to the image side.

The range of the values of the conditional expressions (4) to (10) is preferably set as follows. First of all, the range of the values of the conditional expression (4) is preferably set as follows.

$$1.0 < BFw/fw < 6.0 \quad (4a)$$

By setting the values in the range of the conditional expression (4a), the ratio between the back-focus at the wide angle end and the focal length of the entire system at the wide angle end can be set further appropriately. Therefore, the increase in the entire length and the front lens effective diameter can easily be held down. Also, the optical member such as the optical filter or the like can easily be arranged. The range of the values of the conditional expression (5) is preferably set as follows.

$$20.0 < TD/fw < 33.0 \quad (5a)$$

By setting the values in the range of the conditional expression (5a), the ratio between the length from the first lens plane on the object side to the image plane and the focal length of the entire system at the wide angle end can be set further appropriately. Therefore, the increase in the entire length and the front lens effective diameter can easily be held down. In the same manner, the longitudinal chromatic aberration and the coma aberration at the telephoto end and the fluctuations of the curvature of field in the entire zoom range can easily be reduced. The range of the values of the conditional expression (6) is preferably set as follows.

$$0.0 \leq |M3/M2| < 0.7 \quad (6a)$$

By setting the values in the range of the conditional expression (6a), an amount of movement of the second lens unit L2 at the time of zooming with respect to the amount of movement of the third lens unit L3 at the time of zooming can be set further appropriately. Therefore, the increase in the entire length and the front lens effective diameter can easily be held down. Also, the astigmatism, the coma aberration, and the fluctuations of the curvature of field in the entire zoom range can easily be reduced. The range of the values of the conditional expression (7) is preferably set as follows.

$$0.0 \leq |M3|/fw < 6.0 \quad (7a)$$

By setting the values in the range of the conditional expression (7a), the ratio between a maximum distance of movement of the third lens unit L3 at the time of zooming from the wide angle end to the telephoto end and the distance of movement of the second lens unit L2 at the time of zooming from the wide angle end to the telephoto end can be set further appropriately. Therefore, the increase in the entire length and the front lens effective diameter can easily be held down. Also, the astigmatism, the coma aberration, and the fluctuations of the curvature of field in the entire zoom range can easily be held down. The range of the values of the conditional expression (8) is preferably set as follows.

$$8.5 < f1/fw < 12.5 \quad (8a)$$

By setting the values in the range of the conditional expression (8a), the focal length of the first lens unit L1 can be set further appropriately. Therefore, the increase in the entire length and the front lens effective diameter can easily be held down. At the telephoto end, the correction of the spherical aberration, the longitudinal chromatic aberration, and the coma aberration can easily be corrected further appropriately.

The range of the values of the conditional expression (9) is preferably set as follows.

$$1.5 < (\beta 2t/\beta 2w)/(\beta 3t/\beta 3w) < 3.5 \quad (9a)$$

By setting the values in the range of the conditional expression (9a), the share of the zooming ratio of the second lens unit L2 can be set further appropriately. Therefore, the fluctuations of the astigmatism, the coma aberration, and the curvature of field in the entire zoom range can easily be satisfactorily corrected. Also, the increase in the entire length and the front lens effective diameter can easily be held down. The range of the values of the conditional expression (10) is preferably set as follows.

$$2.3 < |M2/f2| < 3.4 \quad (10a)$$

By setting the values in the range of the conditional expression (10a), the distance of movement of the second lens unit L2 can be set further appropriately. Therefore, the increase in the entire length and the front lens effective diameter can be held down, and the astigmatism, the coma aberration, and the fluctuations of the curvature of field in the entire zoom range can easily be corrected. Also, the increase in the entire length and the front lens effective diameter can easily be held down. In the respective embodiments, five or more lenses in total can be provided as the third and fourth lens units L3 and L4 as a whole on the image side with respect to an aperture in terms of aberration correction.

Furthermore, the aperture SP or an aperture unit can be moved toward the object along the convex locus at the time of zooming from the wide angle end to the telephoto end. Furthermore, the second lens unit can include a negative lens, a negative lens, a negative lens, and a positive lens. In the respective embodiments, the correction of distortion aberration from among the various aberrations may be corrected by an electric image processing.

As described above, in the respective embodiments, the zoom type, the refractive powers of the respective lens units, and so on are appropriately set. Accordingly, the chromatic aberration or the curvature of field is satisfactorily corrected over the entire zoom range from the wide angle end to the telephoto end while achieving the wide angle of view. In particular, by fixing the first lens unit L1 at the time of zooming and setting the respective elements as described above, a compact zoom lens having not only a wide angle of view but also a high optical performance over the entire zoom range is obtained. In addition, according to the respective embodiments, the zoom lens supporting a wide angle of view of 80° or wider and a high zoom ratio on the order of 10 to 20:1, being compact, and having a high optical performance over the entire zoom range from the wide angle end to the telephoto end, and over a total distance to object from the distance to object at infinity to the distance to near object is obtained.

Numerical Examples 1 to 5 according to Embodiments 1 to 5 will be described below. In the respective Numerical Examples, reference symbol i denotes the order of surfaces from the object side, reference symbol ri denotes an $i^{th}$ radius of curvature (the $i^{th}$ plane), reference symbol di denotes a distance from the $i+1^{st}$ plane, and reference symbols ndi, vdi denote an index and an Abbe number of the material of an $i^{th}$ optical member with reference to the d-line respectively. In the numerical examples 1 to 5, two planes closest to the image are planes corresponding to the optical block. As regards an aspherical shape, a displacement in the direction of the optical axis at a position of height H from the optical axis is denoted by X with reference to an apex of the plane. The direction of travel of the light is defined as positive, a paraxial radius of curvature is denoted by R, a conic constant is denoted by k, and relative aspherical coefficients are denoted by A4, A6, and A8 respectively. It is denoted by an expression:

$$X = \frac{H^2/R}{1+\sqrt{1-(1+k)(H/R)^2}} + A4H^4 + A6H^6 + A8H^8$$

The sign * means a surface having an aspherical shape. "e-x" means 10-x. The relationships between the respective conditional expressions described above and the various numerical values in the numerical examples are shown in Table 1.

Numerical Example 1

| Plane Data Unit mm | | | | |
|---|---|---|---|---|
| Plane Number | r | d | nd | vd |
| 1 | −380.702 | 1.35 | 1.90366 | 31.3 |
| 2 | 38.575 | 3.15 | | |
| 3 | 115.168 | 3.13 | 1.72916 | 54.7 |
| 4 | −188.992 | 0.18 | | |
| 5 | 78.282 | 1.35 | 1.72825 | 28.5 |
| 6 | 31.108 | 5.13 | 1.83481 | 42.7 |
| 7 | −601.451 | 0.18 | | |
| 8 | 30.855 | 4.04 | 1.72916 | 54.7 |
| 9 | −1814.505 | (Variable) | | |
| 10 | 211.256 | 0.70 | 1.90366 | 31.3 |
| 11 | 6.994 | 2.38 | | |
| 12 | −356.214 | 0.60 | 1.92286 | 18.9 |
| 13 | 29.264 | 1.63 | | |
| 14 | −12.821 | 0.60 | 1.88300 | 40.8 |
| 15 | 3087.761 | 0.20 | | |
| 16 | 33.849 | 2.40 | 1.92286 | 18.9 |
| 17 | −16.448 | (Variable) | | |
| 18(Aperture) | ∞ | (Variable) | | |
| 19* | 10.785 | 2.82 | 1.58313 | 59.4 |
| 20 | −1000.000 | 6.35 | | |
| 21 | 31.263 | 0.60 | 1.84666 | 23.9 |
| 22 | 9.920 | 0.60 | | |
| 23* | 19.406 | 2.05 | 1.58313 | 59.4 |
| 24 | −101.225 | (Variable) | | |
| 25 | 10.346 | 3.50 | 1.51633 | 64.1 |
| 26 | −11.860 | 0.89 | 1.84666 | 23.9 |
| 27 | −27.227 | (Variable) | | |
| 28 | ∞ | 0.50 | 1.54400 | 60.0 |
| 29 | ∞ | 2.87 | | |
| Image Plane | ∞ | | | |

Aspherical Surface Data

19th surface

K = −6.89675e−001   A4 = −7.92673e−006   A6 = 1.10342e−007
A8 = −1.26501e−009

23th surface

K = −1.03383e+000   A4 = −2.31662e−005

Various Data
Zoom Ratio 9.85

| | Wide Angle | Intermediate | Zoom |
|---|---|---|---|
| Focal Length | 3.52 | 15.88 | 34.66 |
| F number | 1.85 | 2.61 | 2.88 |
| Angle of View | 38.18 | 10.68 | 4.93 |
| Total Length of Lenses | 90.32 | 90.32 | 90.32 |
| d9 | 0.59 | 18.44 | 24.80 |
| d17 | 26.53 | 8.68 | 2.32 |
| d18 | 8.09 | 2.25 | 2.03 |
| d24 | 2.00 | 3.82 | 4.50 |
| d27 | 5.91 | 9.93 | 9.46 |

Data on Zoom Lens Unit

| Unit | Start Plane | Focal Length |
|---|---|---|
| 1 | 1 | 35.52 |
| 2 | 10 | −8.42 |
| 3 | 19 | 23.58 |
| 4 | 25 | 19.08 |

Numerical Example 2

| Unit mm | | | | |
|---|---|---|---|---|
| Plane Data | | | | |
| Plane Number | r | d | nd | vd |
| 1 | −99.101 | 1.35 | 1.90721 | 27.9 |
| 2 | 37.844 | 1.82 | | |
| 3 | 42.833 | 3.36 | 1.48749 | 70.4 |
| 4 | 530.218 | 0.18 | | |
| 5 | 126.072 | 0.55 | 1.90942 | 25.4 |
| 6 | 63.150 | 4.15 | 1.88300 | 40.8 |
| 7 | −62.932 | 0.18 | | |
| 8 | 39.838 | 3.57 | 1.88300 | 40.8 |
| 9 | 343.830 | (Variable) | | |
| 10 | 68.427 | 0.70 | 1.91316 | 23.6 |
| 11 | 7.135 | 2.50 | | |

-continued

Unit mm

| | | | | |
|---|---|---|---|---|
| 12 | −42.334 | 0.60 | 1.90253 | 31.7 |
| 13 | 22.079 | 1.77 | | |
| 14 | −12.259 | 1.44 | 1.88294 | 40.8 |
| 15 | −30.772 | 0.10 | | |
| 16 | 53.054 | 2.28 | 1.92286 | 18.9 |
| 17 | −16.860 | (Variable) | | |
| 18(Aperture) | ∞ | (Variable) | | |
| 19* | 10.555 | 3.12 | 1.58313 | 59.4 |
| 20* | −64.128 | 6.34 | | |
| 21 | 59.706 | 1.00 | 1.79088 | 23.2 |
| 22 | 7.065 | 1.10 | | |
| 23* | 8.610 | 4.43 | 1.58313 | 59.4 |
| 24 | −500.000 | (Variable) | | |
| 25 | 9.655 | 3.31 | 1.48749 | 70.4 |
| 26 | −14.871 | 1.10 | 1.92286 | 18.9 |
| 27 | −30.439 | (Variable) | | |
| 28 | ∞ | 0.50 | 1.51633 | 64.1 |
| Image Plane | ∞ | | | |

Aspherical Surface Data

19th surface

K = 1.47680e−001  A4 = −7.21471e−005  A6 = 4.71537e−009
A8 = −2.68497e−009

20th surface

K = 0.00000e+000  A4 = 4.26534e−005  A6 = 4.87450e−007

23th surface

K = −2.55240e−001  A4 = −5.41365e−006

Various Data
Zoom Ratio 11.40

| | Wide Angle | Intermediate | Zoom |
|---|---|---|---|
| Focal Length | 3.35 | 16.31 | 38.20 |
| F number | 1.85 | 3.07 | 3.50 |
| Angle of View | 42.11 | 10.52 | 4.53 |
| Image Height | 3.03 | 3.03 | 3.03 |
| Total Length of Lenses | 98.42 | 98.42 | 98.42 |
| d9 | 0.50 | 23.04 | 31.08 |
| d17 | 32.88 | 10.34 | 2.30 |
| d18 | 10.19 | 2.28 | 2.17 |
| d24 | 5.90 | 10.22 | 10.50 |
| d27 | 3.52 | 7.10 | 6.93 |

Data on Zoom Lens Unit

| Unit | Start Plane | Focal Length |
|---|---|---|
| 1 | 1 | 40.98 |
| 2 | 10 | −9.40 |
| 3 | 19 | 20.49 |
| 4 | 25 | 19.61 |

Numerical Example 3

Unit mm
Unit mm

Plane Data

| Plane Number | r | d | nd | vd |
|---|---|---|---|---|
| 1 | −994.625 | 1.35 | 1.85997 | 32.6 |
| 2 | 33.776 | 3.53 | | |
| 3 | 191.930 | 2.56 | 1.81382 | 45.4 |
| 4 | −361.868 | 0.18 | | |
| 5 | 36.909 | 1.35 | 1.90824 | 26.3 |
| 6 | 30.666 | 4.21 | 1.55001 | 64.1 |

-continued

Unit mm
Unit mm

| | | | | |
|---|---|---|---|---|
| 7 | −127.659 | 0.18 | | |
| 8 | 42.705 | 3.08 | 1.74733 | 52.2 |
| 9 | −182.732 | (Variable) | | |
| 10 | 349.261 | 0.70 | 1.88299 | 40.8 |
| 11 | 7.885 | 3.23 | | |
| 12 | −26.984 | 0.60 | 1.92286 | 18.9 |
| 13 | −110.745 | 1.16 | | |
| 14 | −16.571 | 0.60 | 1.88227 | 40.8 |
| 15 | −1925.456 | 0.23 | | |
| 16 | 36.337 | 2.04 | 1.92286 | 18.9 |
| 17 | −22.749 | (Variable) | | |
| 18(Aperture) | ∞ | (Variable) | | |
| 19* | 12.991 | 3.57 | 1.58313 | 59.4 |
| 20 | −700.184 | 5.32 | | |
| 21 | 27.478 | 0.60 | 1.84666 | 23.9 |
| 22 | 11.227 | 0.66 | | |
| 23* | 17.366 | 2.37 | 1.58313 | 59.4 |
| 24 | −500.000 | (Variable) | | |
| 25 | 13.925 | 3.30 | 1.48749 | 70.4 |
| 26 | −22.518 | 1.10 | 1.84666 | 23.9 |
| 27 | −62.367 | (Variable) | | |
| 28 | ∞ | 0.50 | 1.51633 | 64.1 |
| Image Plane | ∞ | | | |

Aspherical Surface Data

19th surface

K = 6.09674e−001  A4 = −7.30919e−005  A6 = −3.98760e−007
A8 = −4.94478e−009

23th surface

K = 1.60236e+000  A4 = −6.13804e−005

Various Data
Zoom Ratio 19.53

| | | | | | |
|---|---|---|---|---|---|
| Focal Length | 3.47 | 25.36 | 67.78 | 41.98 | 11.96 |
| F number | 1.85 | 3.07 | 3.50 | 3.33 | 2.49 |
| Angle of View | 41.12 | 6.81 | 2.56 | 4.13 | 14.22 |
| Image Height | 3.03 | 3.03 | 3.03 | 3.03 | 3.03 |
| Total Length of Lenses | 113.62 | 113.62 | 113.62 | 113.62 | 113.62 |
| d9 | 0.50 | 23.11 | 31.17 | 28.02 | 12.35 |
| d17 | 33.15 | 4.73 | 2.48 | 2.87 | 14.20 |
| d18 | 20.88 | 8.30 | 2.35 | 5.40 | 10.92 |
| d24 | 7.65 | 18.73 | 22.70 | 18.42 | 23.91 |
| d27 | 9.00 | 16.31 | 12.48 | 16.47 | 9.82 |

Data on Zoom Lens Unit

| Unit | Start Plane | Focal Length |
|---|---|---|
| 1 | 1 | 40.50 |
| 2 | 10 | −9.34 |
| 4 | 19 | 25.27 |
| 5 | 25 | 30.62 |

Numerical Example 4

Unit mm

Plane Data

| Plane Number | r | d | nd | vd |
|---|---|---|---|---|
| 1 | −72.176 | 1.35 | 1.76700 | 30.6 |
| 2 | 49.925 | 3.17 | | |
| 3 | 533.858 | 3.27 | 1.71756 | 55.1 |
| 4 | −74.913 | 0.18 | | |
| 5 | 49.996 | 1.35 | 1.54745 | 43.1 |
| 6 | 29.995 | 5.94 | 1.48749 | 70.4 |

-continued

Unit mm

| | | | | |
|---|---|---|---|---|
| 7 | −112.011 | 0.18 | | |
| 8 | 32.296 | 4.02 | 1.72916 | 54.7 |
| 9 | 714.717 | (Variable) | | |
| 10 | 41.271 | 0.70 | 1.71142 | 55.3 |
| 11 | 6.512 | 3.07 | | |
| 12 | −122.871 | 0.60 | 1.92286 | 18.9 |
| 13 | −55.400 | 0.60 | | |
| 14 | −23.643 | 0.60 | 1.72916 | 54.7 |
| 15 | 17.051 | 0.54 | | |
| 16 | 11.776 | 1.69 | 1.92286 | 18.9 |
| 17 | 23.221 | (Variable) | | |
| 18(Aperture) | ∞ | 2.15 | | |
| 19* | 11.229 | 2.80 | 1.58313 | 59.4 |
| 20 | −1000.000 | 2.62 | | |
| 21 | 24.582 | 0.60 | 1.84666 | 23.9 |
| 22 | 12.000 | 0.60 | | |
| 23* | 22.519 | 2.01 | 1.58313 | 59.4 |
| 24 | −500.000 | (Variable) | | |
| 25 | 14.491 | 3.23 | 1.51633 | 64.1 |
| 26 | −10.716 | 0.60 | 1.84666 | 23.9 |
| 27 | −20.786 | (Variable) | | |
| 28 | ∞ | 0.50 | 1.51633 | 64.1 |
| Image Plane | ∞ | | | |

Aspherical Surface Data

19th surface $K = -1.14265e-001$  $A4 = -4.17527e-005$  $A6 = -1.37092e-007$
$A8 = -4.85474e-009$ 23th surface $K = -9.76842e-001$  $A4 = -6.57267e-005$ Various Data
Zoom Ratio 9.77

| | Wide Angle | Intermediate | Zoom |
|---|---|---|---|
| Focal Length | 4.22 | 17.48 | 41.24 |
| F number | 1.85 | 3.07 | 3.50 |
| Angle of View | 35.66 | 9.83 | 4.20 |
| Image Height | 3.03 | 3.03 | 3.03 |
| Total Length of Lenses | 90.99 | 90.99 | 90.99 |
| d9 | 0.50 | 20.07 | 27.04 |
| d17 | 29.36 | 9.79 | 2.82 |
| d24 | 9.13 | 3.68 | 4.08 |
| d27 | 9.64 | 15.08 | 14.69 |

Data on Zoom Lens Unit

| Unit | Start Plane | Focal Length |
|---|---|---|
| 1 | 1 | 37.80 |
| 2 | 10 | −8.00 |
| 3 | 19 | 21.69 |
| 4 | 25 | 22.38 |

Numerical Example 5

Unit mm

Plane Data

| Plane Number | r | d | nd | vd |
|---|---|---|---|---|
| 1 | −45.656 | 0.90 | 2.00060 | 25.5 |
| 2 | 45.594 | 1.13 | | |
| 3 | 50.301 | 4.21 | 1.52679 | 75.0 |
| 4 | −47.611 | 0.18 | | |
| 5 | 2172.727 | 0.55 | 1.85258 | 22.8 |
| 6 | 90.235 | 3.55 | 1.99334 | 26.0 |

-continued

Unit mm

| | | | | |
|---|---|---|---|---|
| 7 | −76.694 | 0.18 | | |
| 8 | 52.391 | 2.87 | 1.88300 | 40.8 |
| 9 | −147.508 | (Variable) | | |
| 10 | 228.099 | 0.70 | 1.91554 | 28.7 |
| 11 | 7.638 | 3.75 | | |
| 12* | −11.760 | 1.00 | 1.88300 | 40.8 |
| 13* | −66.035 | 0.86 | | |
| 14 | −39.761 | 0.60 | 1.57730 | 40.1 |
| 15 | −195.558 | 1.03 | | |
| 16 | 2922.226 | 2.01 | 2.00060 | 25.5 |
| 17 | −15.808 | (Variable) | | |
| 18(Aperture) | ∞ | (Variable) | | |
| 19* | 11.037 | 3.89 | 1.55332 | 71.7 |
| 20* | −32.257 | 8.55 | | |
| 21 | −495.353 | 0.23 | 1.79143 | 21.6 |
| 22 | 6.397 | 0.95 | | |
| 23* | 9.687 | 3.45 | 1.72685 | 54.8 |
| 24* | −100.000 | (Variable) | | |
| 25* | −66.101 | 3.89 | 1.80205 | 46.4 |
| 26 | −5.051 | 1.10 | 1.77529 | 22.2 |
| 27 | −7.710 | (Variable) | | |
| 28 | ∞ | 0.50 | 1.51680 | 64.2 |
| Image Plane | | | | |

Aspherical Surface Data

12th surface $K = 0.00000e+000$  $A4 = -6.81331e-005$  $A6 = -3.65398e-007$
$A8 = 1.91682e-008$ 13th surface $K = 0.00000e+000$  $A4 = -1.39610e-004$ 19th surface $K = 1.15570e-002$  $A4 = -6.40872e-005$  $A6 = -6.72903e-008$
$A8 = -2.87431e-009$ 20th surface $K = 0.00000e+000$  $A4 = 7.35012e-005$  $A6 = -3.75867e-008$ 23th surface $K = 7.74399e-001$  $A4 = 4.93278e-005$ 24th surface $K = 0.00000e+000$  $A4 = 1.22558e-005$  $A6 = -5.51779e-007$ 25th surface $K = 0.00000e+000$  $A4 = -1.01364e-003$  $A6 = -1.09648e-005$
$A8 = -2.42048e-007$ Various Data
Zoom Ratio 11.31

| | Wide Angle | Intermediate | Zoom |
|---|---|---|---|
| Focal Length | 3.35 | 20.17 | 37.88 |
| F number | 1.85 | 3.07 | 3.50 |
| Angle of View | 42.12 | 8.54 | 4.57 |
| Image Height | 3.03 | 3.03 | 3.03 |
| Total Length of Lenses | 96.73 | 96.73 | 96.73 |
| d9 | 0.50 | 22.47 | 30.32 |
| d17 | 32.10 | 10.13 | 2.28 |
| d18 | 11.77 | 2.62 | 4.88 |
| d24 | 2.32 | 13.35 | 11.93 |
| d27 | 3.97 | 2.10 | 1.25 |

Data on Zoom Lens Unit

| Unit | Start Plane | Focal Length |
|---|---|---|
| 1 | 1 | 40.76 |
| 2 | 10 | −12.77 |
| 3 | 19 | 20.38 |
| 4 | 25 | 10.32 |

TABLE 1

| | | Embodiment 1 | Embodiment 2 | Embodiment 3 | Embodiment 4 | Embodiment 5 |
|---|---|---|---|---|---|---|
| Conditional Expression (1) | H12/fw | −0.61 | −1.49 | −1.12 | −0.38 | −2.75 |
| Conditional Expression (2) | f1/f3 | 1.51 | 2.00 | 1.60 | 1.74 | 2.00 |
| Conditional Expression (3) | T1/fw | 5.26 | 4.52 | 4.74 | 4.61 | 4.05 |
| Conditional Expression (4) | BFw/fw | 2.58 | 1.15 | 2.69 | 2.36 | 1.28 |
| Conditional Expression (5) | TD/fw | 25.61 | 29.32 | 32.69 | 21.51 | 28.82 |
| Conditional Expression (6) | |M3/M2| | 0.25 | 0.26 | 0.60 | 0.00 | 0.23 |
| Conditional Expression (7) | |M3|/fw | 1.72 | 2.39 | 5.34 | 0.00 | 2.06 |
| Conditional Expression (8) | f1/fw | 10.09 | 12.23 | 11.67 | 8.95 | 12.17 |
| Conditional Expression (9) | (β2t/β2w)/(β3t/β3w) | 1.80 | 2.42 | 2.68 | 2.26 | 3.20 |
| Conditional Expression (10) | |M2/f2| | 2.88 | 3.25 | 3.29 | 3.32 | 2.33 |

Subsequently, referring now to FIG. 13, an Embodiment of a video camera in which the zoom lens according to the invention is used as a photographic optical system will be described. In FIG. 13, reference numeral 10 denotes a video camera body, and reference numeral 11 denotes a photographic optical system made up of a zoom lens according to at least one embodiment of the present invention. Reference numeral 12 denotes a solid-state image pickup apparatus (photoelectric conversion apparatus) such as a CCD sensor or a CMOS sensor which receives an object image formed by the photographic optical system 11. Reference numeral 13 denotes a memory configured to store information corresponding to the object image having been subject to photoelectric conversion by the sold-state image pickup apparatus 12, and reference numeral 14 denotes a finder configured to observe the object image displayed by a display device, not shown. By applying the zoom lens according to at least one embodiment of the present invention to an image pickup apparatus such as a video camera, a compact image pickup apparatus having high optical performance is realized. The zoom lens according to the various embodiments disclosed herein can also be applied to a digital still camera in the same manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-251844 filed Nov. 10, 2010, which is hereby incorporated by reference herein in its entirety.

What is claimed is:

1. A zoom lens, comprising:
a first lens unit having a positive refractive power;
a second lens unit having a negative refractive power;
an aperture stop;
a third lens unit having a positive refractive power; and
a fourth lens unit having a positive refractive power,
wherein the first, second, third and fourth lens units are arranged in order from an object side to an image side,
wherein the first lens unit is fixed, and the second and fourth lens units are moved so that a distance between the first lens unit and the second lens unit is increased and a distance between the second lens unit and the third lens unit is decreased at the time of zooming from a wide angle end to a telephoto end,
wherein the first lens unit includes a first negative lens, a first positive lens, a second negative lens, a second positive lens, and a third positive lens in order from the object side to the image side, the third and fourth lens units include two or more lenses, and
wherein, when f1 and f3 are focal lengths of the first and third lens units respectively, fw is a focal length of an entire system at the wide angle end, T1 is a thickness of the first lens unit on an optical axis, and H12 is a distance between principal points between the first lens unit and the second lens unit at the wide angle end,
conditional expressions:

$$-5.0 < H12/fw < -0.2$$

$$1.5 < f1/f3 < 4.0$$

$$2.0 < T1/fw < 10.0$$

are satisfied.

2. The zoom lens according to claim 1, wherein a conditional expression;

$$0.5 < BFw/fw < 10.0$$

where BFw is an air-equivalent length of back-focus at the wide angle end
is satisfied.

3. The zoom lens according to claim 1, wherein a conditional expression;

$$15.0 < TD/fw < 40.0$$

where TD is an entire length of lenses in the entire system
is satisfied.

4. The zoom lens according to claim 1, wherein a conditional expression;

$$0.0 \leq |M3/M2| < 1.5$$

where M2 is a difference in position between the wide angle end and the telephoto end of the second lens unit on the optical axis and M3 is a difference in position between the wide angle end and the telephoto end of the third lens unit on the optical axis
is satisfied.

5. The zoom lens according to claim 1, wherein a conditional expression;

$$0.0 \leq |M3|/fw < 10.0$$

where M3 is the difference in position between the wide angle end and the telephoto end of the third lens unit on the optical axis
is satisfied.

6. The zoom lens according to claim 1, wherein the focal length f1 of the first lens unit satisfies a conditional expression;

$$5.0 < f1/fw < 15.0.$$

7. The zoom lens according to claim 1, wherein a conditional expression;

$$1.0 < (\beta 2t/\beta 2w)/(\beta 3t/\beta 3w) < 5.0$$

where β2w and β2t are lateral magnifications of the second lens unit at the wide angle end and the telephoto end respectively and β3w and β3t are lateral magnifications of the third lens unit at the wide angle end and the telephoto end respectively,
is satisfied.

8. The zoom lens according to claim 1, wherein a conditional expression;

$$2.0<|M2/f2|<3.5$$

where M2 is the difference in position between the wide angle end and the telephoto end of the second lens unit on the optical axis and f2 is a focal length of the second lens unit,
is satisfied.

9. The zoom lens according to claim 1, wherein
a shot image is moved in the vertical direction with respect to the optical axis by moving an entirety or part of the third lens unit so as to have a component in the vertical direction with respect to the optical axis.

10. The zoom lens according to claim 1, wherein the aperture stop moves at the time of zooming.

11. The zoom lens according to claim 1, wherein the second lens unit includes a first negative lens, a second negative lens, a third negative lens, and a positive lens in order from the object side to the image side.

12. An image pickup apparatus comprising:
a zoom lens according; and
an image pickup element configured to receive an image formed by the zoom lens,
wherein the zoom lens comprises:
a first lens unit having a positive refractive power;
a second lens unit having a negative refractive power;
an aperture stop;
a third lens unit having a positive refractive power; and
a fourth lens unit having a positive refractive power,
wherein the first, second, third and fourth lens units are arranged in order from an object side to an image side,
wherein the first lens unit is fixed, and the second and fourth lens units are moved so that a distance between the second lens unit and the third lens unit is decreased at the time of zooming from a wide angle end to a telephoto end,
wherein the first lens unit includes a first negative lens, a first positive lens, a second negative lens, a second positive lens, and a third positive lens in order from the object side to the image side, the third and fourth lens units include two or more lenses, and
wherein, when f1 and f3 are focal lengths of the first and third lens units respectively, fw is a focal length of an entire system at the wide angle end, T1 is a thickness of the first lens unit on an optical axis, and H12 is a distance between principal points between the first lens unit and the second lens unit at the wide angle end,
conditional expressions:

$$-5.0<H12/fw<-0.2$$

$$1.5<f1/f3<4.0$$

$$2.0<T1/fw<10.0$$

are satisfied.

* * * * *